(12) United States Patent
Steiner et al.

(10) Patent No.: US 8,410,706 B2
(45) Date of Patent: Apr. 2, 2013

(54) METHOD OF CALIBRATING A DAYLIGHT SENSOR

(75) Inventors: James P. Steiner, Royersford, PA (US); Greg Edward Sloan, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 390 days.

(21) Appl. No.: 12/727,923

(22) Filed: Mar. 19, 2010

(65) Prior Publication Data

US 2010/0244706 A1   Sep. 30, 2010

Related U.S. Application Data

(60) Provisional application No. 61/164,098, filed on Mar. 27, 2009, provisional application No. 61/174,322, filed on Apr. 30, 2009.

(51) Int. Cl.
*H05B 37/02* (2006.01)

(52) U.S. Cl. ........ 315/149; 315/150; 315/152; 315/158; 315/159; 362/276; 362/802

(58) Field of Classification Search .......... 315/149–150, 315/152, 158–159; 362/276, 802; 250/214 AL, 250/227.14
See application file for complete search history.

(56) References Cited

U.S. PATENT DOCUMENTS

| | | | |
|---|---|---|---|
| 4,236,101 A | | 11/1980 | Luchaco |
| 4,701,669 A | | 10/1987 | Head et al. |
| 5,248,919 A | | 9/1993 | Hanna et al. |
| 5,357,170 A | * | 10/1994 | Luchaco et al. ............ 315/159 |
| 5,701,058 A | * | 12/1997 | Roth ............................ 315/158 |
| 6,084,231 A | * | 7/2000 | Popat ..................... 250/214 AL |
| 6,583,573 B2 | * | 6/2003 | Bierman ....................... 315/149 |
| 7,024,119 B1 | | 4/2006 | Mier-Langner et al. |
| 7,027,736 B1 | | 4/2006 | Mier-Langner et al. |
| 7,045,968 B1 | * | 5/2006 | Bierman et al. .............. 315/244 |
| 7,111,952 B2 | | 9/2006 | Veskovic |
| 7,190,126 B1 | | 3/2007 | Paton |

(Continued)

FOREIGN PATENT DOCUMENTS

| | | |
|---|---|---|
| DE | 102005012148 A1 | 6/2006 |
| EP | 1610197 A2 | 12/2005 |

(Continued)

OTHER PUBLICATIONS

Somfy Systems Inc., Sunis Indoor WireFree RTS Sun Sensor Brochure, Feb. 2009, 2 pages.

(Continued)

*Primary Examiner* — Jason M Crawford
(74) *Attorney, Agent, or Firm* — Mark E. Rose; Philip N. Smith; Bridget L. McDonough

(57) ABSTRACT

A wireless lighting control system comprises a daylight sensor for measuring a light intensity in a space and a dimmer switch for controlling the amount of power delivered to a lighting load in response to the daylight sensor. For example, the daylight sensor may be able to transmit radio-frequency (RF) signals to the dimmer switch. The system provides methods of calibrating the daylight sensor that allow for automatically measuring and/or calculating one or more operational characteristics of the daylight sensor. One method of calibrating the daylight sensor comprises a "single-button-press" calibration procedure during which a user is only required to actuate a calibration button of the daylight sensor once. In addition, the daylight sensor is operable to automatically measure the total light intensity in the space at night to determine the light intensity of only the electrical light generated by the lighting load.

41 Claims, 26 Drawing Sheets

U.S. PATENT DOCUMENTS

| | | | |
|---|---|---|---|
| 7,193,201 B2 | 3/2007 | Motte | |
| 7,277,930 B2 | 10/2007 | Hillis et al. | |
| 7,369,060 B2 | 5/2008 | Veskovic et al. | |
| 7,482,565 B2 | 1/2009 | Morgan et al. | |
| 7,566,137 B2 | 7/2009 | Veskovic | |
| 7,588,067 B2 | 9/2009 | Veskovic | |
| 7,619,539 B2 | 11/2009 | Veskovic et al. | |
| 7,781,713 B2 * | 8/2010 | Papamichael et al. | 250/205 |
| 2006/0091822 A1 * | 5/2006 | Bierman et al. | 315/244 |
| 2009/0278479 A1 * | 11/2009 | Platner et al. | 315/312 |
| 2010/0045191 A1 * | 2/2010 | Aendekerk | 315/152 |
| 2010/0244709 A1 | 9/2010 | Steiner et al. | |

FOREIGN PATENT DOCUMENTS

| | | |
|---|---|---|
| WO | WO97/25836 A1 | 7/1997 |
| WO | WO03/043385 A1 | 5/2003 |

OTHER PUBLICATIONS

Watt Stopper/Legrand, Press Release: Automatic Calibrating Daylighting Controller Optimizes Performance for Increased Savings, Feb. 2009, 1 page.

Watt Stopper/Legrand, LightSaver LS-102 Switching Photosensor Specification Sheet, Sep. 2009, 2 pages.

Watt Stopper/Legrand, LightSaver LS-102 Daylighting Controller Installation Instructions, Jun. 2009, 6 pages.

European Patent Office, International Search Report and Written Opinion for International Patent Application No. PCT/US2010/028281, Jun. 17, 2010, 15 pages.

* cited by examiner

METHOD OF CALIBRATING A DAYLIGHT SENSOR

CROSS-REFERENCE TO RELATED APPLICATIONS

This application is a non-provisional application of commonly-assigned U.S. Provisional Application Ser. No. 61/164,098, filed Mar. 27, 2009, entitled METHOD OF CALIBRATING A DAYLIGHT SENSOR, and U.S. Provisional Application Ser. No. 61/174,322, filed Apr. 30, 2009, entitled WIRELESS BATTERY-POWERED DAYLIGHT SENSOR, the entire disclosures of which are hereby incorporated by reference.

BACKGROUND OF THE INVENTION

1. Field of the Invention

The present invention relates to daylight sensors for measuring the ambient light level (i.e., the total light intensity) in a space, and more particularly, to method of calibrating a daylight sensor of a lighting control system having a lighting control device, such as a dimmer switch.

2. Description of the Related Art

Many rooms in both residential and commercial buildings are illuminated by both artificial light (i.e., electric light) from a lighting load, such as an incandescent lamp or a fluorescent lamp, and daylight (i.e., sunlight) shining through a window. Daylight sensors (i.e., photosensors) are often used to measure the total light intensity in a space in order to control the lighting load. For example, the intensity of the lighting load may be decreased as the total light intensity increases, and vice versa. In order to operate properly in the space in which the daylight sensor is mounted, the daylight sensor must be calibrated after installation. However, the calibration procedures of most prior art daylight sensors are tedious and require many steps that involve human interaction with the daylight sensor. Therefore, there is a need for a more automated procedure of calibrating a daylight sensor.

SUMMARY OF THE INVENTION

According to an embodiment of the present invention, a method of calibrating a daylight sensor for measuring a light intensity in a space requires a single actuation of a calibration button of the daylight sensor. The daylight sensor operates as part of a lighting control system that comprises a dimmer switch for controlling a present light intensity of a lighting load, so as to control a total light intensity on a task surface in the space. The method comprising the steps of:
(1) installing the daylight sensor on a surface; (2) adjusting the present light intensity of the lighting load, such that the total light intensity on the task surface is at a target task surface light intensity; (3) actuating the calibration button on the daylight sensor; (4) measuring the total light intensity at the daylight sensor in response to the actuation of the button on the daylight sensor; (5) the daylight sensor subsequently transmitting the total measured light intensity to the dimmer switch; and (6) the dimmer switch subsequently calculating a daylight gain in response to the total light intensity measured by the daylight sensor and the present light intensity of the lighting load.

According to another embodiment of the present invention, a dimmer switch controls the amount of power delivered from an AC power source to a lighting load to control a present light intensity of the lighting load in response to a light intensity in a space, so as to control a total light intensity on a task surface in the space, is also described herein. The dimmer switch comprises a controllably conductive device adapted to be coupled in series electrical connection between the source and the load for controlling the amount of power delivered to the load, a controller coupled to a control input of the controllably conductive device for controlling the controllably conductive device to adjust the present light intensity of the lighting load, such that the total light intensity on the task surface is at a target task surface light intensity, and a communication circuit coupled to the controller and adapted to receive a digital message including a value representative of the light intensity in the space. The controller calculates a daylight gain in response to the value representative of the light intensity in the space and the present light intensity of the lighting load.

According to another aspect of the present invention, a method of calibrating a daylight sensor for measuring a light intensity in a space comprises the steps of: (1) installing the daylight sensor on a surface; (2) the daylight sensor periodically measuring the light intensity in the space; (3) comparing the measured light intensity to a threshold; (4) the load control device adjusting the intensity of the lighting load to a predetermined intensity when the measured light intensity has dropped below the threshold; (5) the daylight sensor measuring the magnitude of the light intensity in the space when intensity of the lighting load is at the predetermined intensity to generate an electric-light-only measured light intensity value, the electric-light-only measured light intensity value being representative of the light intensity of only the lighting load; and (6) storing the electric-light-only measured light intensity value in a memory.

In addition, a daylight sensor for measuring a light intensity in a space is also described herein. The daylight sensor is adapted to operate as part of a lighting control system that comprises a dimmer circuit for controlling the amount of power delivered to a lighting load. The daylight sensor comprises a photosensitive circuit operable to generate a light intensity control signal in response to the light intensity in the space, a transmitter for transmitting signals, and a controller coupled to the photosensitive circuit and the transmitter. The controller is operable to transmit signals in response to the light intensity control signal, periodically measure the light intensity in the space, compare the measured light intensity to a threshold, and transmit a command to adjust the intensity of the lighting load to a predetermined intensity when the measured light intensity has dropped below the threshold. The controller measures the magnitude of the light intensity in the space when the light intensity of the lighting load is at the predetermined intensity to generate a electric-light-only measured light intensity value, and stores the electric-light-only measured light intensity value in a memory. The electric-light-only measured light intensity value is representative of the light intensity of only the lighting load.

According to another aspect of the present invention, a method of controlling the amount of power delivered to a lighting load to a new light intensity in a system comprising a dimmer circuit and a daylight sensor for measuring a total light intensity in a space comprises the steps of: (1) storing in a memory one or more light intensity values representative of the light intensity of only the lighting load; (2) calculating a light intensity value representative of the light intensity at the daylight sensor that results from only the light emitted by the lighting load at the new light intensity as a function of the light intensity values stored in the memory; (3) calculating the new intensity value as a function of the difference between a present measured light intensity and the value representative of the light intensity at the daylight sensor that results from only the light emitted by the lighting load; and (4) the dimmer circuit subsequently adjusting the intensity of the lighting load to the new intensity.

According to another embodiment of the present invention, a daylight sensor for measuring a light intensity in a space comprises a photosensitive circuit operable to generate a light intensity control signal in response to the light intensity in the space, a transmitter for transmitting signals, a controller coupled to the photosensitive circuit and the transmitter, the controller operable to transmit signals in response to the light intensity control signal, and a memory for storing one or more light intensity values representative of the light intensity of only the lighting load. The controller calculates a present light intensity value representative of the light intensity at the daylight sensor that results from only the light emitted by the lighting load at a present light intensity of the lighting load as a function of the light intensity values stored in the memory. The controller calculates a new light intensity for the lighting load as a function of the difference between a present measured light intensity and the present light intensity value representative of the light intensity at the daylight sensor that results from only the light emitted by the lighting load, and transmits a command to adjust the intensity of the lighting load to the new light intensity.

According to yet another embodiment of the present invention, a dimmer switch for controlling the amount of power delivered from an AC power source to a lighting load comprises a controllably conductive device adapted to be coupled in series electrical connection between the source and the lighting load for controlling the amount of power delivered to the lighting load, a controller coupled to a control input of the controllably conductive device for controlling the controllably conductive device to adjust the present light intensity of the lighting load (such that the total light intensity on the task surface is at a target task surface light intensity), a memory for storing at least one light intensity value representative of the light intensity of only the lighting load, and a communication circuit coupled to the controller and adapted to receive a digital message including a value representative of a total light intensity in the space. The controller calculates a present light intensity value representative of the total light intensity in the space that results from only the light emitted by the lighting load at a present light intensity of the lighting load as a function of the light intensity value stored in the memory, calculates a new light intensity for the lighting load as a function of the difference between a present measured light intensity and the present light intensity value representative of the light intensity at the daylight sensor that results from only the light emitted by the lighting load, and adjusts the intensity of the lighting load to the new light intensity.

According to another aspect of the present invention, a method of calibrating a daylight sensor for measuring a light intensity in a space comprises the steps of: (1) placing the daylight sensor on a task surface; (2) adjusting the present light intensity of the lighting load, such that the total light intensity on the task surface is at a target task surface light intensity; (3) measuring the light intensity at the daylight sensor to generate a total-at-task-surface light intensity value; (4) turning off the lighting load; (5) measuring the light intensity at the daylight sensor to generate a daylight-at-task-surface light intensity value; (6) installing the daylight sensor on a ceiling surface; (7) adjusting the present light intensity of the lighting load, such that the total light intensity on the task surface is at the target task surface light intensity; (8) measuring the light intensity at the daylight sensor to generate a total-at-ceiling light intensity value; (9) turning off the lighting load; (10) measuring the light intensity at the daylight sensor to generate a daylight-at-ceiling light intensity value; and (11) calculating one or more gains using the total-at-task-surface light intensity value, the daylight-at-task-surface light intensity value, the total-at-ceiling light intensity value, and the daylight-at-ceiling light intensity value.

According to one embodiment of the present invention, the step of adjusting may comprise actuating a button on the daylight sensor to adjust the present light intensity of the lighting load. According to another embodiment of the present invention, the method of calibrating a daylight sensor may comprise the steps of installing a first daylight sensor on a ceiling surface, and placing a second daylight sensor on the task surface. According to yet another embodiment of the present invention, the method of calibrating a daylight sensor may comprise the steps of displaying a representation of the total light intensity measured by the daylight sensor on a visual display of the daylight sensor, and adjusting the present light intensity of the lighting load until the visual display on the daylight sensor displays a representation of a target task surface light intensity, such that the total light intensity on the task surface is equal to the target task surface light intensity. According to yet another embodiment of the present invention, the method of calibrating a daylight sensor may comprises the steps of actuating a button on the daylight sensor until a visual display of the daylight sensor displays a representation of a target task surface light intensity, and automatically adjusting the present light intensity of the lighting load, such that the total light intensity on the task surface is equal to the target task surface light intensity.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
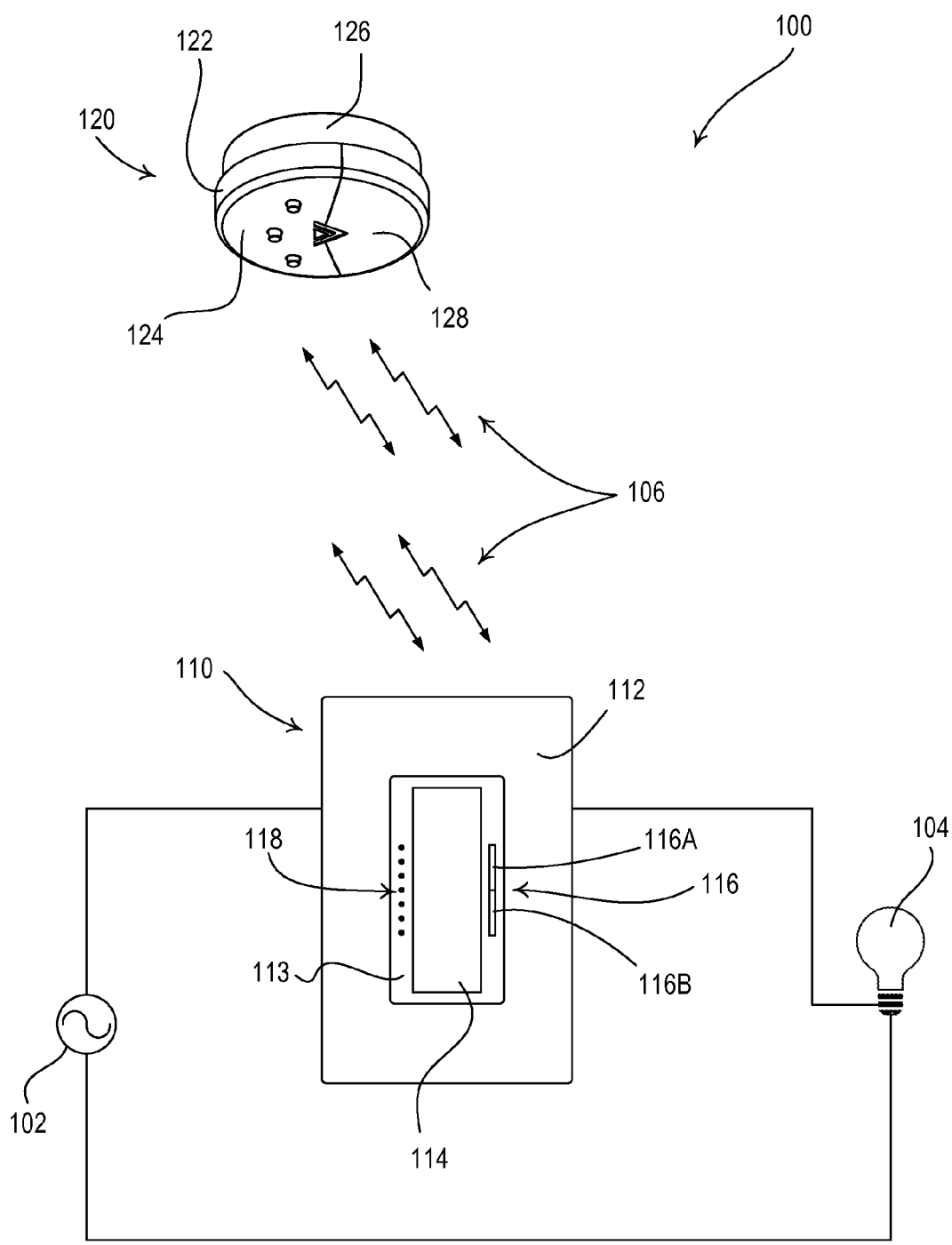
FIG. 1 is a simple diagram of a radio-frequency (RF) lighting control system comprising a dimmer switch and a daylight sensor according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of a radio-frequency (RF) lighting control system 100 comprising a load control device (e.g., a dimmer switch 110) and a daylight sensor 120 according to a first embodiment of the present invention. The dimmer switch 110 is adapted to be coupled in series electrical connection between an alternating-current (AC) power source 102 and a lighting load 104 for controlling the amount of power delivered to the lighting load. The dimmer switch 110 may be wall-mounted in a standard electrical wallbox, but could alternatively be implemented as a table-top load control device. As shown in FIG. 1, the dimmer switch 110 comprises a faceplate 112 and a bezel 113 received in an opening of the faceplate. The dimmer switch 110 further comprises a control actuator 114 (i.e., a button) and an intensity adjustment actuator 116. Actuations of the toggle actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease a present intensity $L_{PRES}$ of the lighting load 104 from a minimum intensity (e.g., 1%) to a maximum intensity (e.g., "full-on" or 100%). A plurality of visual indicators 118, e.g., light-emitting diodes (LEDs), are arranged in a linear array on the left side of the bezel 113. The visual indicators 118 are illuminated to provide feedback of the present intensity $L_{PRES}$ of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

The daylight sensor 120 is mounted so as to measure a total light intensity $L_{T-SNSR}$ in the space around the daylight sensor (i.e., in the vicinity of the lighting load 104 controlled by the dimmer switch 110). The daylight sensor 120 includes an internal photosensitive circuit 231 (FIG. 5A), which is housed in an enclosure 122 having a cover portion 124 and a base portion 126. The enclosure 122 comprises a lens 128, which is provided in a front surface of the cover portion 124 and conducts light from outside the daylight sensor towards the internal photosensitive circuit 231. The daylight sensor 120 is responsive to the total light intensity $L_{T-SNSR}$ measured by the internal photosensitive circuit. Specifically, the daylight sensor 120 is operable to wirelessly transmit digital messages to the dimmer switch 110 via RF signals 106 in response to the measured total light intensity $L_{T-SNSR}$, such that the dimmer switch 110 is operable to control the present light intensity $L_{PRES}$ of the lighting load 104 in response to the total light intensity $L_{TOT}$ in the space around the lighting load.

During a setup procedure of the RF lighting control system 100, the daylight sensor 120 may be assigned to (i.e., associated with) the dimmer switch 110. As mentioned above, the daylight sensor 120 transmits digital messages wirelessly via the RF signals 106 to the dimmer switch 110 in response to the measured total light intensity $L_{T-SNSR}$. A message transmitted by the daylight sensor 120 may include a command and identifying information, for example, a 52-bit serial number (i.e., a unique identifier) associated with the daylight sensor. The dimmer switch 110 is responsive to messages containing the serial numbers of the daylight sensor 120 to which the dimmer switch is assigned. The command included in each digital message transmitted by the daylight sensor includes a specific new intensity $L_{NEW}$ for the lighting load 104. Accordingly, the dimmer switch 110 controls the present intensity $L_{PRES}$ of the lighting load 104 to the new intensity $L_{NEW}$ in response to receiving a digital message with a command from the daylight sensor 120.

Examples of RF lighting control systems are described in greater detail in U.S. patent application Ser. No. 12/033,223, filed Feb. 19, 2008, entitled COMMUNICATION PROTOCOL FOR A RADIO-FREQUENCY LOAD CONTROL SYSTEM; U.S. patent application Ser. No. 12/203,518, filed Sep. 3, 2008, entitled RADIO-FREQUENCY LIGHTING CONTROL SYSTEM WITH OCCUPANCY SENSING; and U.S. patent application Ser. No. 12/371,027, filed Feb. 13, 2009, entitled METHOD AND APPARATUS FOR CONFIGURING A WIRELESS SENSOR. The entire disclosures of all of these applications are hereby incorporated by reference.

Figure 2:
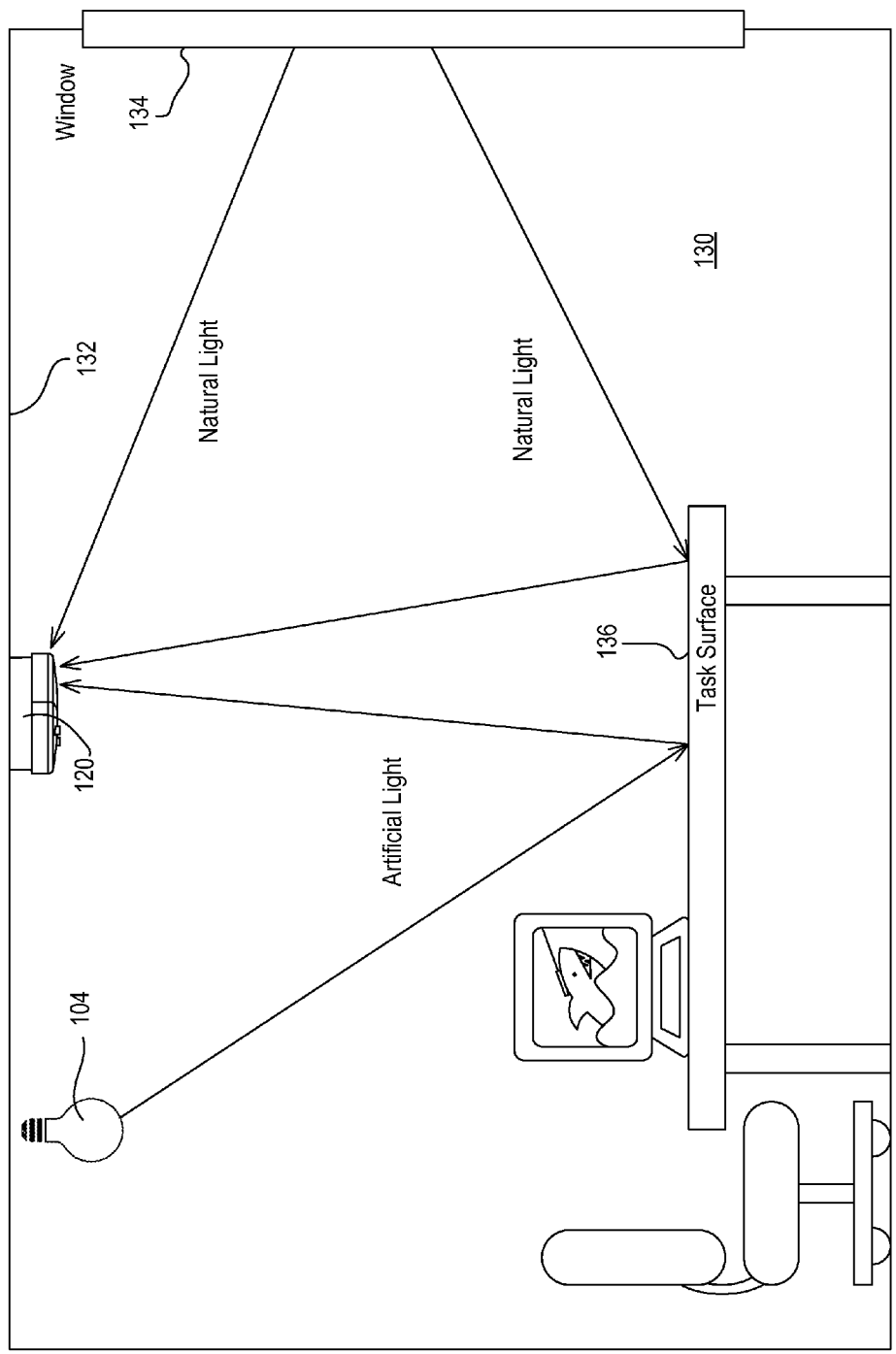
FIG. 2 is a simplified diagram of a room in which the daylight sensor of FIG. 1 may be mounted.

FIG. 2 is a simplified diagram of a room 130 (i.e., a space) in which the daylight sensor 120 may be mounted. The daylight sensor 120 is mounted to a ceiling 132 of the room 130 at a distance from a window 134 through which natural light (i.e., daylight) shines. The lighting load 104 is also mounted to the ceiling 132 of the room. The room 130 contains a task surface 136 (e.g., a table) that is illuminated by the natural light shining through the window 134 and the electric light (i.e., artificial light) generated by the lighting load 104. A total light intensity $L_{T\text{-}TASK}$ produced on the task surface 136 is the sum of a light intensity $L_{D\text{-}TASK}$ on the task surface from only daylight entering the room 130 through the window 134 and a light intensity $L_{E\text{-}TASK}$ on the task surface from only the lighting load 104 (i.e., $L_{T\text{-}TASK} = L_{D\text{-}TASK} + L_{E\text{-}TASK}$). The daylight sensor 120 is operable to measure the total light intensity $L_{T\text{-}SNSR}$ at the daylight sensor, which is also a combination of the natural light and the electric light in the room 130. The natural and electric light that shine onto the task surface 136 may be reflected to the daylight sensor 120, while the natural light from the window 134 may shine directly onto the daylight sensor. Thus, the total light intensity $L_{T\text{-}SNSR}$ measured by the daylight sensor 120 is the sum of a light intensity $L_{D\text{-}SNSR}$ at the daylight sensor from only daylight entering the room 130 through the window 134 and a light intensity $L_{E\text{-}SNSR}$ at the daylight sensor from only the lighting load 104 (i.e., $L_{T\text{-}SNSR} = L_{D\text{-}SNSR} + L_{E\text{-}SNSR}$).

Since the light intensity of the reflected light shining on the daylight sensor 120 is less than the light intensity of the light shining directly on the task surface 136, the daylight sensor is characterized by a gain M, which is representative of the difference between the light intensity at the daylight sensor and at the task surface. The daylight sensor 120 uses the gain M to attempt to control the illuminance (i.e., the light intensity) on the task surface 136 to the target total task surface light intensity $L_{TRGT\text{-}TASK}$ (i.e., a setpoint). The gain M of the daylight sensor 120 is set during a gain calibration procedure 500, which will be described in greater detail below with reference to FIGS. 9A and 9B.

The dimmer switch 110 adjusts the present light intensity $L_{PRES}$ of the lighting load 104 so as to control the total light intensity $L_{T\text{-}TASK}$ on the task surface 136 towards a target total task surface light intensity $L_{TRGT\text{-}TASK}$. For example, the target total task surface light intensity $L_{TRGT\text{-}TASK}$ may be preset to be approximately fifty foot-candles. In addition, the target total task surface light intensity $L_{TRGT\text{-}TASK}$ may be decreased by actuating the intensity adjustment actuator 116. Alternatively, the dimmer switch 110 could be operable to receive one or more digital messages from an advanced programming device, such as a lighting a personal digital assistant (PDA) or a personal computer (PC), such that the target total task surface light intensity $L_{TRGT\text{-}TASK}$ may be entered using a graphical user interface (GUI) and transmitted to the dimmer switch 110. Further, the target total task surface light intensity $L_{TRGT\text{-}TASK}$ could alternatively be adjusted using an advanced programming mode of the dimmer switch 110. An example of an advanced programming mode for a dimmer switch is described in greater detail in U.S. Pat. No. 7,190,125, issued Mar. 13, 2007, entitled PROGRAMMABLE WALLBOX DIMMER, the entire disclosure of which is hereby incorporated by reference.

According to an embodiment of the present invention, the daylight sensor 120 is further operable to measure the light intensity of only the electric light generated by the lighting load 104 at different light intensities of the lighting load 104 using a midnight calibration procedure 600. Specifically, the daylight sensor 120 is operable to wait until a time during the night (e.g., at midnight) when the intensity of the natural light is substantially small, i.e., less than a midnight calibration threshold intensity $S_{TH\text{-}MID}$, e.g., approximately 20 foot-candles (FC). At this time, the daylight sensor 120 is operable to cause the dimmer switch 110 to turn on the lighting load 104 to multiple intensity levels $L_{HE}$, $L_{LE}$ (e.g., 100% and 1% of the maximum intensity, respectively) and to measure the electric light intensities $L_{EM1}$, $L_{EM2}$ in the room 130 for each intensity level $L_{HE}$, $L_{LE}$ of the lighting load. The daylight sensor 120 is thus operable to control the present intensity $L_{PRES}$ of the lighting load 104 in response to the gain M and the electric light intensities $L_{EM1}$, $L_{EM2}$ determined during the midnight calibration procedure 600. The midnight calibration procedure 600 is described in greater detail below with reference to FIG. 10.

Figure 3A:
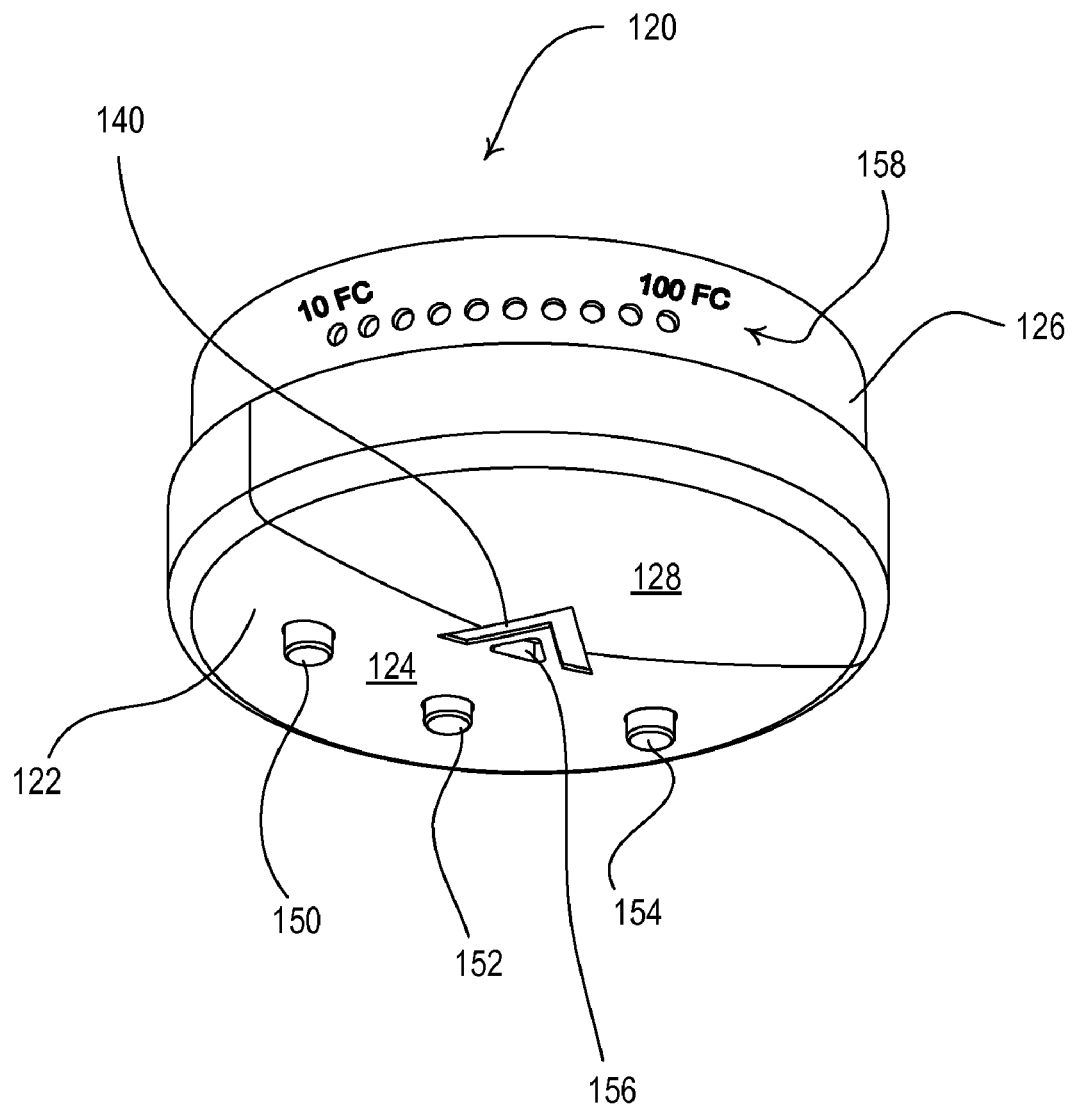
FIG. 3A is an enlarged perspective view of the daylight sensor of FIG. 1.

FIG. 3A is an enlarged perspective view of the daylight sensor 120. The base portion 126 of the enclosure 122 is adapted to be attached to the ceiling 132 (or other mounting surface in the room 130). The lens 128 is transparent such that the light from the room 130 is able to shine onto the internal photosensitive diode 232 (FIG. 5A) of the daylight sensor 120. The daylight sensor 120 is positioned on the ceiling 132 such that an arrow 140 points towards the window 134, such that lens 128 is directed towards the window 134. As a result, more natural light than artificial light will shine through the lens 128 and onto the internal photosensitive diode 232. The front portion 124 may be fully rotatable with respect to the base portion 126, such that the arrow 140 and thus the lens 128 may be easily directed towards the window 134 after the daylight sensor 120 is mounted to the ceiling 132. A daylight sensor comprising a rotatable enclosure is described in greater detail in U.S. Provisional Patent Application No. 61/285,691, filed Dec. 11, 2009, entitled DAYLIGHT SENSOR HAVING A ROTATABLE ENCLOSURE, the entire disclosure of which is hereby incorporated by reference.

A plurality of actuators (e.g., a calibration button 150, a raise button 152, and a lower button 154) are used during the gain calibration procedure 500 of the daylight sensor 120. The daylight sensor 120 further comprises a laser-pointer receiving opening 156, which is adapted to receive energy from a laser pointer (not shown). The daylight sensor 120 is responsive to the energy of the laser pointer shining through the laser-pointer receiving opening 156. When the daylight sensor 120 is mounted to the ceiling 132, a user may shine the laser pointer through the opening 156 rather than actuating the calibration button 150 during the gain calibration procedure.

According to the first embodiment of the present invention, the daylight sensor 120 is also operable to operate as a photometer. The daylight sensor 120 includes a visual display comprising a linear array 158 of visual indicators provided on the base portion 126. The linear array 158 of visual indicators are illuminated by light-emitting diodes (LEDs) 242 (FIG. 5A) inside the daylight sensor 120. Specifically, one of the visual indicators of the linear array 158 is illuminated to display a representation of the actual total light intensity $L_{T\text{-}SNSR}$ measured by the daylight sensor 120. The outermost visual indicators of the linear array 158 are labeled "10 FC" and "100 FC", such that the linear array provides a linear scale of light intensities between 10 foot-candles and 100 foot-candles. Alternatively, the visual display could alternatively be implemented as one or more seven-segment displays.

Figure 3B:
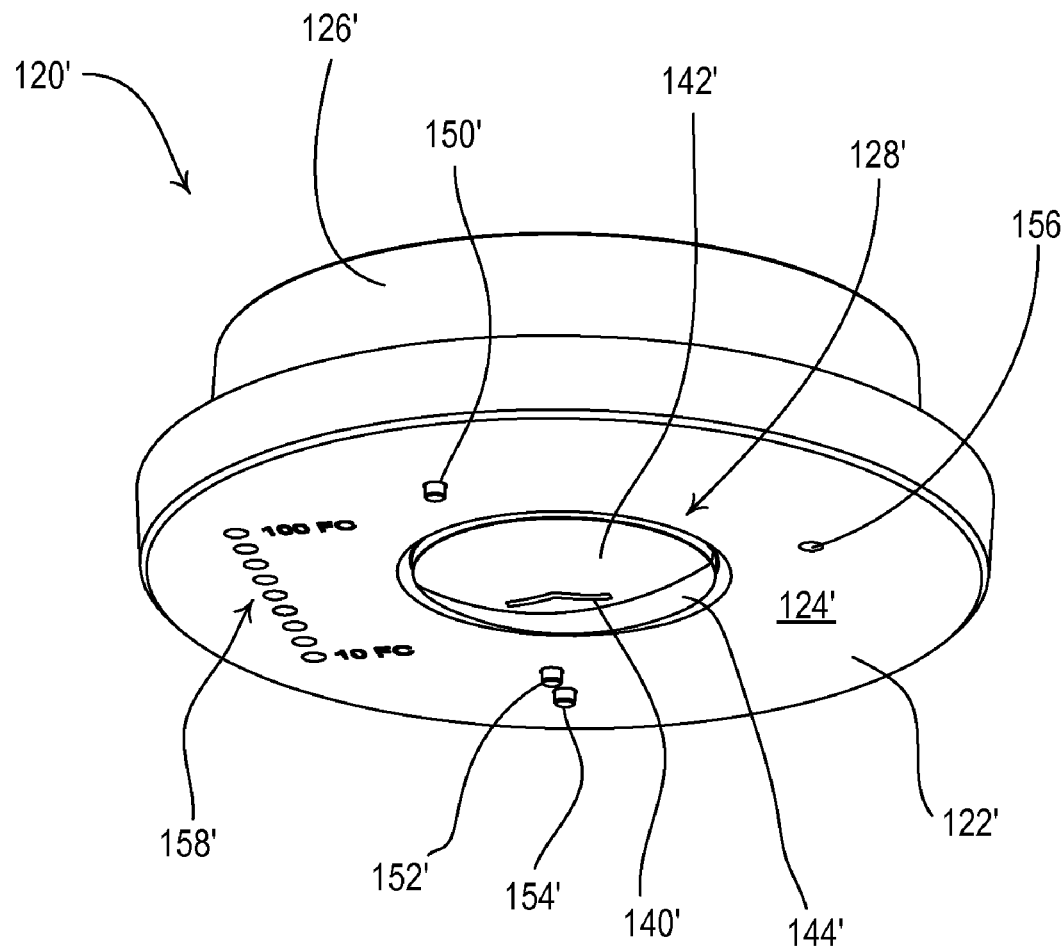
FIG. 3B is a perspective view of an alternate embodiment of the daylight sensor of FIG. 3A.

FIG. 3B is an enlarged perspective view of a daylight sensor 120' according to an alternate embodiment of the present invention. The daylight sensor 120' comprises an enclosure 122' having a cover portion 124' and a base portion 126'. A lens 128' is provided in the cover portion 124' and comprises a transparent portion 142' (through which the light from the room 130 shines onto the internal photosensitive circuit 231) and an obfuscating portion 144'. The daylight sensor 120' is positioned on the ceiling 132 such that an arrow 140' points towards the window 134. Accordingly, the transparent portion 142' is directed towards the window 134 and the obfuscating portion 144' is directed away from the window, such that more natural light than artificial light shines onto the internal photosensitive circuit 231. A linear array 158' of visual indicators is provided on the front surface of the cover portion 124', such that the visual display of the photometer may be easily seen when the daylight sensor 120' is mounted to the ceiling 132.

Figure 4:
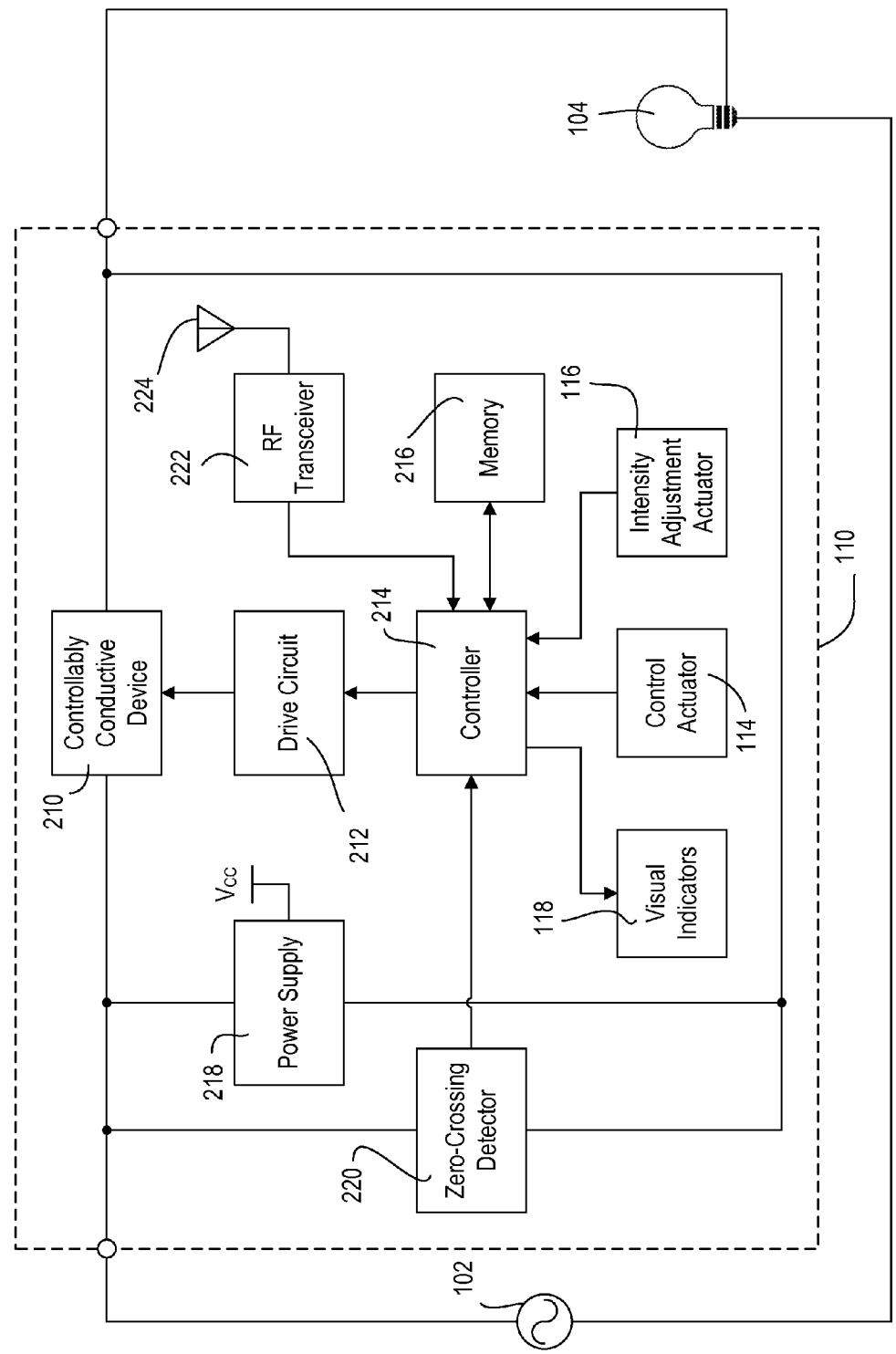
FIG. 4 is a simplified block diagram of the dimmer switch of FIG. 1.

FIG. 4 is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input to the control input will render the controllably conductive device 210 conductive or non-conductive, which in turn controls the amount of power supplied to the lighting load 104.

The drive circuit 212 provides control inputs to the controllably conductive device 210 in response to command signals from a controller 214. The controller 214 is, for example, a microcontroller, but may alternatively be any suitable processing device, such as a programmable logic device (PLD), a microprocessor, or an application specific integrated circuit (ASIC). The controller 214 receives inputs from the control actuator 114 and the intensity adjustment actuator 116 and controls the visual indicators 118. The controller 214 is also coupled to a memory 216 for storage of the serial number of the daylight sensor 120 to which the dimmer switch 110 is assigned and other operational characteristics of the dimmer switch 110 or the daylight sensor. The memory 216 may be implemented as an external integrated circuit (IC) or as an internal circuit of the controller 214. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to controller 214. The controller 214 provides the control input to the drive circuit 212 to operate the controllably conductive device 210 (i.e., to provide voltage from the AC power supply 102 to the lighting load 104) at predetermined times relative to the zero-crossing points of the AC waveform.

The dimmer switch 110 further comprises an RF transceiver 222 and an antenna 224 for receiving the RF signals 106 from the daylight sensor 120. The controller 214 is operable to control the controllably conductive device 210 in response to the messages received via the RF signals 106. Examples of the antennas for wall-mounted dimmer switches, such as the dimmer switch 110, are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME. The entire disclosures of both patents are hereby incorporated by reference.

Figure 5A:
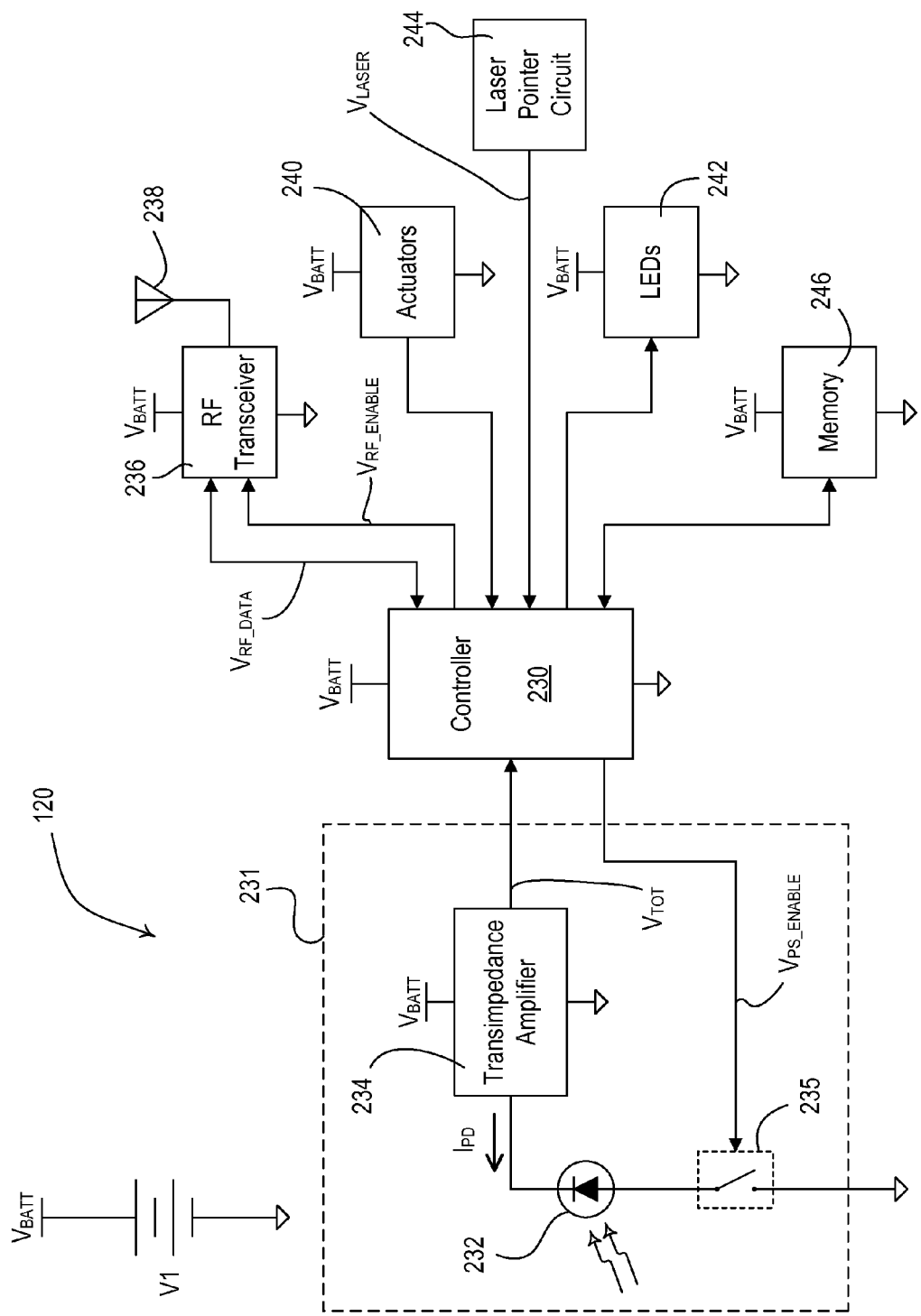
FIG. 5A is a simplified block diagram of the daylight sensor of FIG. 1.

FIG. 5A is a simplified block diagram of the daylight sensor 120. The daylight sensor 120 comprises a controller 230 that is responsive to the photosensitive circuit 231, which comprises a photosensitive diode 232. The cathode of the photosensitive diode 232 is coupled to the controller 230 via a transimpedance amplifier 234, which operates as a current-to-voltage converter. The anode of the photosensitive diode 232 is coupled to circuit common through a controllable switch 235, which allows the controller 230 to enable and disable the photosensitive circuit 231 (using a photosensitive circuit enable control signal $V_{PS\_ENABLE}$) as will be described in greater detail below.

The photosensitive diode 232 conducts a photosensitive diode current $I_{PD}$ having a magnitude dependent upon the magnitude of the light that shines on the photosensitive diode (i.e., the total light intensity $L_{T\text{-}SNSR}$ at the daylight sensor 120). The transimpedance amplifier 234 provides the controller 230 with a total light intensity control signal $V_{TOT}$ representative of the total light intensity $L_{T\text{-}SNSR}$ measured by the daylight sensor 120. Specifically, the magnitude of the total light intensity control signal $V_{TOT}$ generated by the transimpedance amplifier 234 is dependent upon the magnitude of the current $I_{PD}$ conducted by the photosensitive diode 232, and thus the total light intensity $L_{T\text{-}SNSR}$ at the daylight sensor 120. The controller 230 comprises an analog-to-digital converter (ADC), such that the controller is operable to sample the total light intensity control signal $V_{TOT}$ to generate a total light intensity sample $S_{TOT}$. The controller 230 uses a sample period $T_{SAMPLE}$ of, for example, approximately one second, such that the controller samples the total light intensity control signal $V_{TOT}$ approximately once every second during normal operation of the daylight sensor 120.

The daylight sensor 120 further comprises an RF transceiver 236, which is coupled to the controller 230 and an antenna 238. The controller 230 is operable to cause the RF transceiver 236 to transmit a digital message to the dimmer switch 110 via the RF signals 106 in response to the magnitude of the total light intensity control signal $V_{TOT}$. Each transmitted message comprises the serial number of the daylight sensor 120 and the appropriate command (i.e., the new intensity level $L_{NEW}$ for the lighting load 104), which is dependent upon total light intensity $L_{T\text{-}SNSR}$ measured by the daylight sensor. The controller 230 may also be operable to receive a digital message from the dimmer switch 110 or another remote control device, such as a personal digital assistant (PDA), for configuring the operation of the daylight sensor 120. The controller 230 provides the digital message to transmit to the RF transceiver 236 and obtains received digital messages from the RF transceiver via an RF data control signal $V_{RF\_DATA}$. The controller 230 also is operable to enable and disable the RF transceiver via an RF-enable control signal $V_{RF\_ENABLE}$. Alternatively, the RF transceiver 236 of the daylight sensor 120 could comprise an RF transmitter and the RF transceiver 222 of the dimmer switch 110 could comprise an RF receiver to allow only for one-way communication between the daylight sensor and the dimmer switch. The RF transmitter may comprise, for example, part number CC1150 manufactured by Texas Instruments Inc.

The controller 230 of the daylight sensor 120 is also responsive to a plurality of actuators 240 (i.e., the calibration button 150, the raise button 152, and the lower button 154), which provide user inputs to the daylight sensor 120 for use during calibration of the daylight sensor as will be described in greater detail below. The controller 230 is operable to illuminate the LEDs 242 to provide a visual representation of the total light intensity $L_{T\text{-}SNSR}$ measured by the daylight sensor 120 on the linear array 158 of visual indicators (i.e., the daylight sensor operates as a photometer). A laser pointer circuit 244 is coupled to the controller 230 and is responsive to light that shines through the laser-pointer receiving opening 156 from a laser pointer. Specifically, the controller 230 responds to an excitation of the laser pointer circuit 244 in the same manner as an actuation of the calibration button 150.

The controller 230 is further coupled to a memory 246 for storing the gain M and other operational characteristics of the daylight sensor 120, which will be described below. The controller 230 stores "midnight calibration" light intensity samples $S_{EM1}$, $S_{EM2}$ (i.e., electric-light-only light intensity values) that are representative of the electric light intensities $L_{EM1}$, $L_{EM2}$ in the room 130 at different intensity levels $L_{HE}$, $L_{LE}$ of the lighting load 104 without natural light present (i.e., during the night) as measured during the midnight calibration procedure 600. In addition, the controller 230 is operable to store a historical record of the total light intensity $L_{T\text{-}SNSR}$ measured by the daylight sensor 120 and the values of the operational characteristics in the memory 246. The daylight sensor 120 also comprises a battery V1 that provides a battery voltage $V_{BATT}$ (e.g., approximately 3 volts) for powering the controller 230, the photosensitive circuit 231, the RF transceiver 236, and the other circuitry of the daylight sensor 120.

The controller 230 is operable to control the photosensitive circuit 231 and the RF transceiver 236 in order to conserve battery power. Specifically, the controller 230 is operable to enable the photosensitive circuit 231 (by closing the switch 235 via the photosensitive circuit enable control signal $V_{PS\_ENABLE}$) for a small time period $T_{PD}$ (e.g., 50 msec) during each sampling period $T_{SAMPLE}$, such that that the photosensitive diode 232 only conducts current for a portion of time during normal operation (e.g., 5% of the time). In addition, the controller 230 only enables the RF transceiver 236 (via the RF enable control signal $V_{RF\_ENABLE}$) when required. Specifically, the controller 230 only enables the RF transceiver 236 to transmit digital messages when the new intensity $L_{NEW}$ is outside a deadband (as will be described in greater detail below with reference to FIG. 7). The controller 230 only enables the RF transceiver 236 to receive digital messages in response to the laser pointer circuit 244 receiving light from a laser pointer through the laser-pointer receiving opening 156. When the photosensitive circuit 231 and the RF transceiver 236 are disabled, the controller 230 is operable to enter a sleep mode in which the controller consumes less power.

As previously mentioned, the commands transmitted in the digital messages from the daylight sensor 120 to the dimmer switch 110 include new intensity levels $L_{NEW}$ for the lighting load 104. The controller 230 determines the new intensity levels $L_{NEW}$ in response to the total light intensity sample $S_{TOT}$, the gain M, and the midnight calibration light intensity samples $S_{EM1}$, $S_{EM2}$, as will be described in greater detail below. In order to determine the appropriate gain M, the controller 230 is operable to execute the gain calibration procedure 500 in response to a user input (e.g., an actuation of the calibration button 150 or an excitation of the laser pointer circuit 244).

The controller 230 is further operable to determine the midnight calibration light intensity samples $S_{EM1}$, $S_{EM2}$ using the midnight calibration procedure 600. The controller 230 attempts to execute the midnight calibration procedure 600 during the first night after the daylight sensor 120 is first powered up. Specifically, the daylight sensor 120 waits until the total light intensity $L_{T\text{-}SNSR}$ measured by the daylight sensor 120 drops below a predetermined midnight intensity threshold $L_{TH\text{-}MID}$ and then executes the midnight calibration procedure 600. If the total light intensity $L_{T\text{-}SNSR}$ does not drop below the midnight intensity threshold $L_{TH\text{-}MID}$ for a midnight calibration timeout period $T_{MID\text{-}TO}$ (e.g., approximately three days), the daylight sensor 120 is operable to determine a time of day $t_{LOW}$ when the magnitude of the total light intensity $L_{T\text{-}SNSR}$ measured by the daylight sensor 120 had dropped to the lowest magnitude in the last twenty-four hours and then to execute the midnight calibration procedure 600 at this time of day $t_{LOW}$ during the next twenty-four hours. The daylight sensor 120 is further operable to continue re-executing the midnight calibration procedure 600 until an error in the midnight calibration light intensity samples $S_{EM1}$, $S_{EM1}$ is minimized.

The controller 230 is also operable to determine when it is daytime and nighttime in response to the total light intensity control signal $V_{TOT}$ and the historical record stored in the memory 246. The controller 230 may increase the length of the sampling period $T_{SAMPLE}$ (e.g., to approximately three seconds) during the nighttime, such that the controller samples the total light intensity control signal $V_{TOT}$ less frequently and consumes even less power.

Figure 5B:
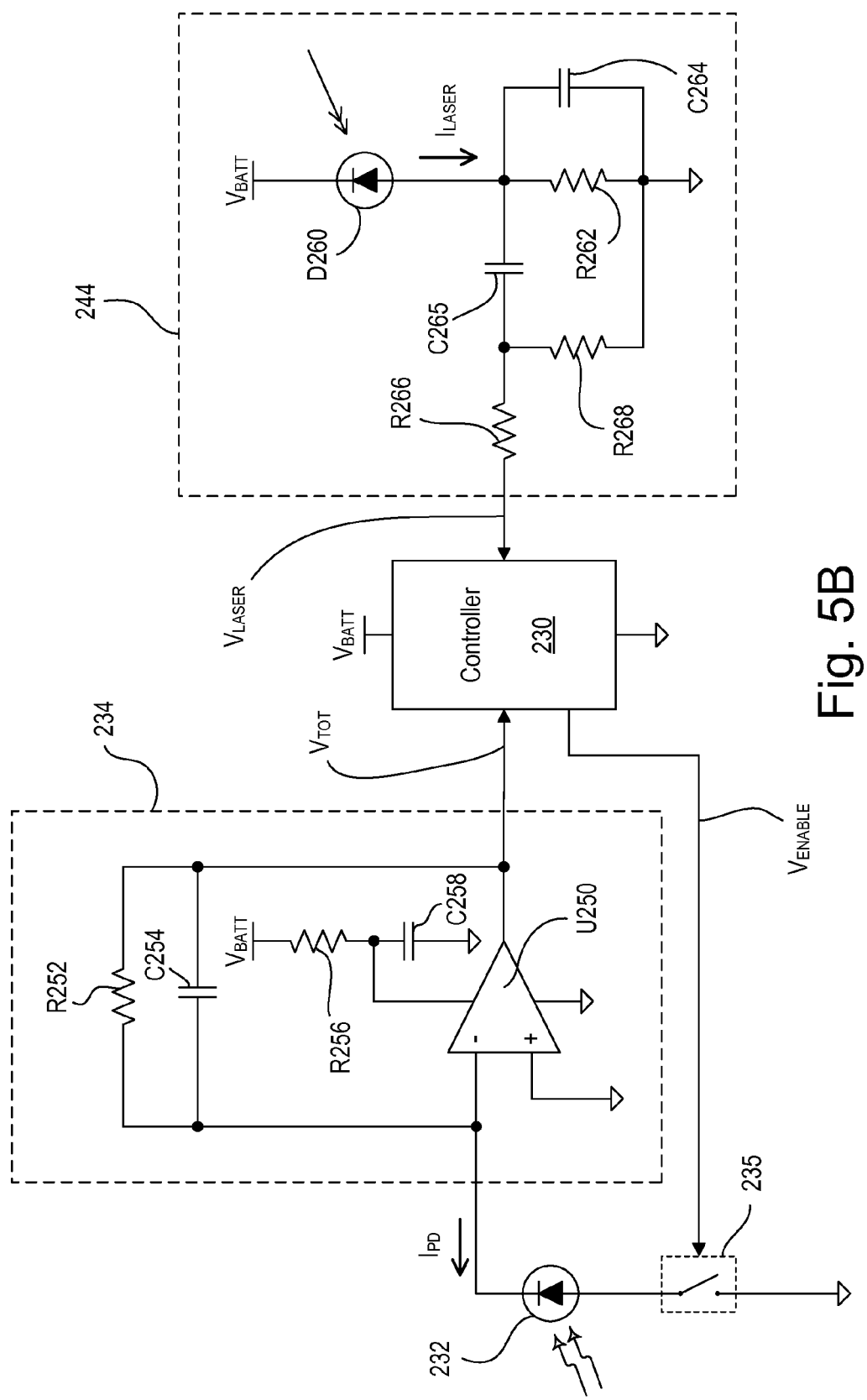
FIG. 5B is a simplified schematic diagram of the daylight sensor of FIG. 5A.

FIG. 5B is a simplified schematic diagram of the daylight sensor 120 showing the transimpedance amplifier 234 and the laser pointer circuit 244 in greater detail. The transimpedance amplifier 234 comprises an operational amplifier ("op-amp") U250 having a non-inverting input terminal coupled to circuit common. A feedback resistor R252 is coupled between an inverting input terminal and an output terminal of the op-amp U250. The output terminal of the op-amp U250 provides to the controller 230 the total light intensity control signal $V_{TOT}$, which has a magnitude that varies in response to the magnitude of the photosensitive diode current $I_{PD}$. The cathode of the photosensitive diode 232 is coupled to the inverting input terminal of the op-amp U250, such that the photosensitive diode current $I_{PD}$ is conducted through the feedback resistor R252. Thus, the magnitude of the total light intensity control signal $V_{TOT}$ is dependent upon the magnitude of the photosensitive diode current $I_{PD}$ and the resistance of the feedback resistor R252. For example, the resistor R252 may have a resistance of approximately 60 kΩ, such that the magnitude of the total light intensity control signal $V_{TOT}$ ranges from approximately zero volts to three volts as the light intensity shining directly on the photosensitive diode 232 ranges from approximately zero lux to 1000 lux.

The transimpedance amplifier 234 further comprises a feedback capacitor C254 (e.g., having a capacitance of approximately 0.1 µF) for providing some low-pass filtering, such that the magnitude of the total light intensity control signal $V_{TOT}$ is not responsive to high-frequency noise in the photosensitive diode current $I_{PD}$. In addition, the comparator U250 is powered from the battery V1 through a low-pass filter comprising a resistor R256 (e.g., having a resistance of approximately 22Ω and a capacitor C258 (e.g., having a capacitance of approximately 0.01 µF). The low-pass filter prevents high-frequency noise that may be coupled to the battery V1 from the RF transceiver 236 from affecting the operation of the photosensitive circuit 231.

The laser pointer circuit 244 comprises a laser-responsive element, e.g., a light-emitting diode (LED) D260. The LED D260 is positioned inside the daylight sensor 120 such that light from a laser pointer may shine through the laser-pointer receiving opening 156 and onto the LED. The LED D260 may be a green LED, such that a laser current $I_{LASER}$ conducted through the LED increases in magnitude when a green laser pointer is shined onto the LED. A resistor R262 is coupled between the anode of the LED D260 and circuit common and has, for example, a resistance of approximately 1 MΩ. A capacitor C264 is coupled in parallel with the resistor R262 and has, for example, a capacitance of approximately 0.01 µF. The junction of the LED D260 and the resistor R262 is coupled to the controller 230 through a capacitor C265 (e.g., having a capacitance of approximately 0.22 µF) and a resistor R266 (e.g., having a resistance of approximately 10 kΩ). The junction of the capacitor C265 and the resistor R266 is coupled to circuit common through a resistor R268 (e.g., having a resistance of approximately 1 MΩ). When a laser pointer is shined onto the LED D260 and the laser current $I_{LASER}$ increases in magnitude, the voltage across the parallel combination of the resistor R262 and the capacitor C264 also increases in magnitude. Accordingly, the capacitor C265 conducts a pulse of current and the laser pointer control signal $V_{LASER}$ also increases in magnitude. The input of the controller 230 that receives the laser pointer control signal $V_{LASER}$ is an interrupt pin, such that the controller 230 is operable to come out of sleep mode in response to the laser pointer shining on the laser point circuit 244. The controller 230 may then be operable to enable the RF transceiver 236 to receive a digital message as will be described in greater detail below with reference to FIG. 14.

Figure 6:
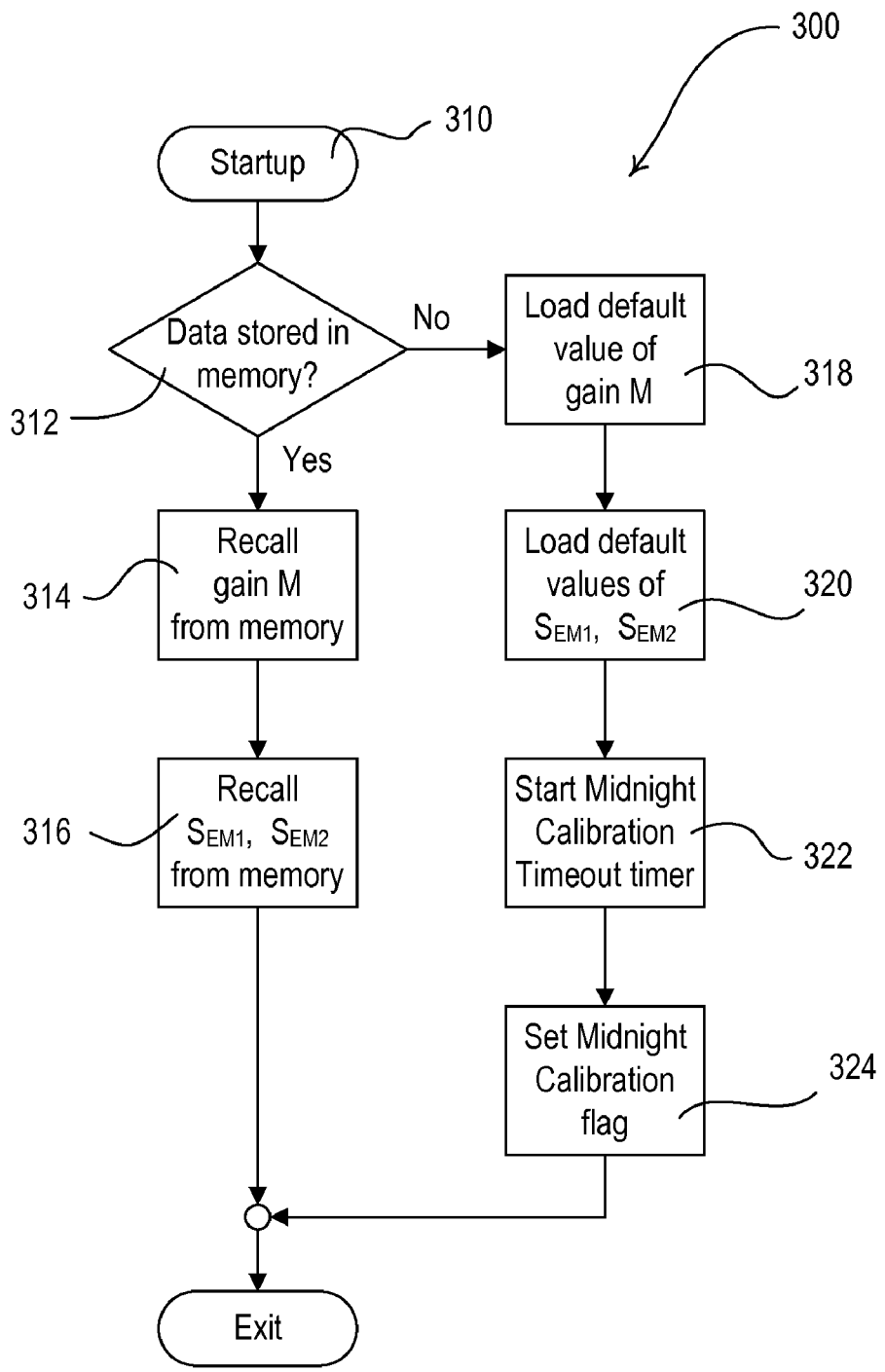
FIG. 6 is a simplified flowchart of a startup procedure executed by a controller of the daylight sensor of FIG. 1.

FIG. 6 is a simplified flowchart of a startup procedure 300 executed by the controller 230 of the daylight sensor 120 each time the controller is powered up at step 310. If there is operational data (i.e., the gain M and the midnight calibration light intensity samples $S_{EM1}$, $S_{EM2}$) stored in the memory 246 at step 312, the controller 230 simply recalls the gain M from the memory at step 314 and recalls the midnight calibration light intensities $S_{EM1}$, $S_{EM2}$ from the memory at step 316, before the startup procedure 300 exits. If the operational data is not stored in the memory 246 at step 312 (i.e., the daylight sensor 120 has not been previously calibrated), the controller 230 loads default values of the gain M at step 318 and default values of the midnight calibration light intensity samples $S_{EM1}$, $S_{EM2}$ at step 320. At step 322, the controller 230 initializes a midnight calibration timeout timer to the midnight calibration timeout period $T_{MID-TO}$ (i.e., three days) and starts the timer decreasing with respect to time. When the midnight calibration timeout timer expires, the daylight sensor 120 will determine the time of day $t_{LOW}$ when the magnitude of the total light intensity $L_{T-SNSR}$ measured by the daylight sensor 120 dropped to the lowest magnitude in the last twenty-four hours, such that the daylight sensor 120 may execute the midnight calibration procedure 600 at this time $t_{LOW}$ during the next twenty-four hours (as will be described in greater detail below with reference to FIGS. 11 and 12). Referring back to FIG. 6, the controller 230 sets a midnight calibration flag at step 324, such that the daylight sensor 120 will execute the midnight calibration procedure 600 if the total light intensity $L_{T-SNSR}$ drops below the midnight intensity threshold $L_{TH-MID}$ during normal operation before the midnight calibration timeout $T_{MID-TO}$ expires. Finally, the startup procedure 300 exits, and the daylight sensor 120 begins normal operation.

Figure 7:
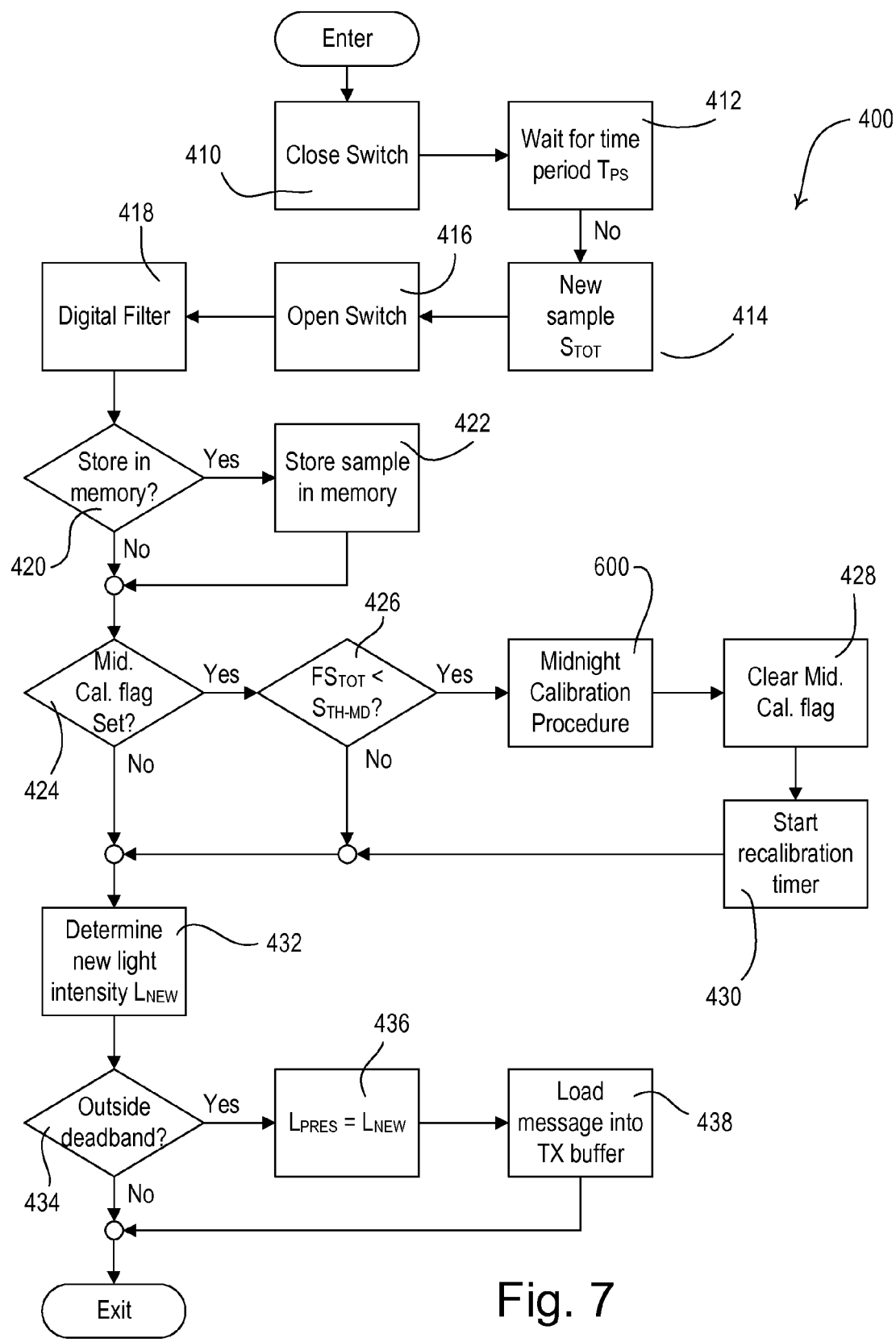
FIG. 7 is a simplified flowchart of a control procedure executed periodically by the controller of the daylight sensor of FIG. 1.

FIG. 7 is a simplified flowchart of a control procedure 400 executed periodically (e.g., every one to three seconds) by the controller 230 of the daylight sensor 120 during normal operation. At step 410, the controller 230 enables the photosensitive circuit 231 by closing the switch 235 using the photosensitive circuit enable control signal $V_{PS\_ENABLE}$. The controller 230 waits for the time period $T_{PD}$ (i.e., 50 msec) at step 412 to allow the photosensitive diode current $I_{PD}$ to become representative of the total light intensity $L_{TOT}$ in the room 130. The controller 230 then samples the total light level control signal $V_{TOT}$ (using the ADC) to generate a new total light intensity sample $S_{TOT}$ at step 414, and disables the photosensitive circuit 231 by opening the switch 235 using the photosensitive circuit enable control signal $V_{PS\_ENABLE}$ at step 416. At step 418, the total light intensity sample $S_{TOT}$ is applied to a digital filter to generate a filtered total light intensity sample $FS_{TOT}$. The controller 230 is operable to periodically store the filtered total light intensity samples $FS_{TOT}$ (e.g., every 30 minutes) to create the historical record in the memory 246 of the total light intensity $L_{TOT}$ in the room 130. Specifically, if the controller 230 should store the present filtered total light intensity sample $FS_{TOT}$ at step 420, the controller stores the present filtered total light intensity sample $FS_{TOT}$ in the memory 246 at step 422.

If the midnight calibration flag is set at step 424 and the filtered total light intensity sample $FS_{TOT}$ is less than the midnight calibration threshold intensity $S_{TH-MID}$ at step 426, the controller 230 executes the midnight calibration procedure 600 to determine the midnight calibration light intensity samples $S_{EM1}$, $S_{EM2}$. After executing the midnight calibration procedure 600, the controller 230 clears the midnight calibration flag at step 428. At step 430, the controller 230 initializes a recalibration timer to a predetermined time (e.g., two days) and starts the recalibration timer decreasing with respect to time. When the recalibration timer expires, the controller 230 will re-execute the midnight calibration procedure 600 (as described in greater detail below with reference to FIG. 13).

After starting the recalibration timer at step 430 or if the filtered total light intensity sample $FS_{TOT}$ is not less than the midnight intensity threshold $L_{TH-MID}$ at step 426, the controller 230 determines the new intensity $L_{NEW}$ for the lighting load 104 at step 432, e.g., $$L_{NEW} = L_{TRGT\text{-}TASK} - M \cdot [FS_{TOT} - S_{EM}(L_{PRES})] \quad \text{(Equation 1)}$$

where $$S_{EM}(L_{PRES}) = (S_{EM1} - S_{EM2}) \cdot L_{PRES} + S_{EM2} \quad \text{(Equation 2)}$$

At step 434, the controller 230 determines if the new intensity $L_{NEW}$ is outside the deadband, e.g., $$L_{PRES} - \Delta < L_{NEW} < L_{PRES} + \Delta \quad \text{(Equation 3)}$$

where Δ represents a predetermined increment by which the new intensity $L_{NEW}$ must differ from the present intensity $L_{PRES}$ before the daylight sensor 120 will transmit a digital message to the dimmer switch 110 causing the dimmer switch to adjust the present intensity $L_{PRES}$ of the lighting load 104 to the new intensity $L_{NEW}$. For example, the predetermined increment Δ may be 1% of the total dimming range of the dimmer switch 110). Alternatively, the deadband could be implemented in terms of total light intensity $L_{T-SNSR}$ measured by the daylight sensor 120, such that the filtered total light intensity sample $FS_{TOT}$ must change by a predetermined increment before the daylight sensor 120 will transmit a digital message to the dimmer switch 110.

If the new intensity $L_{NEW}$ is within the deadband at step 434, the control procedure 300 exits without adjusting the present intensity $L_{PRES}$ of the lighting load 104. However, if the new intensity $L_{NEW}$ is outside the deadband at step 434, the controller 230 stores the new intensity $L_{NEW}$ as the present intensity $L_{PRES}$ at step 436. The controller 230 loads a digital message (including a command to control the intensity of the lighting load 104 to the new intensity $L_{NEW}$) into a transmit (TX) buffer at step 438, before the control procedure 400 exits. The controller 230 will transmit the digital message to the dimmer switch 110 via the RF signals 106 using a transmit procedure (not shown). An example of a transmit procedure is described in previously-referenced U.S. patent application Ser. No. 12/203,518.

Figure 8:
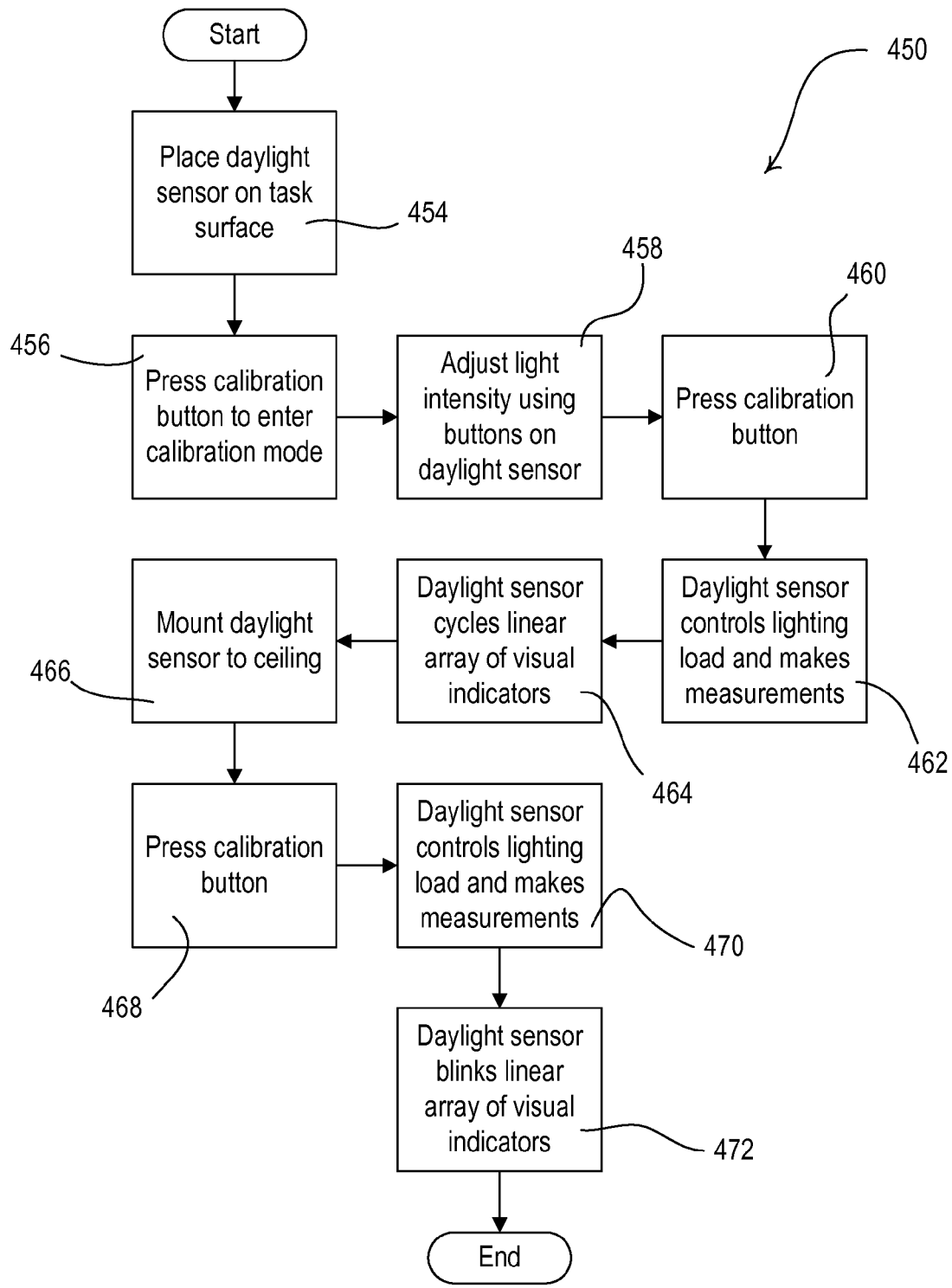
FIG. 8 is a simplified high-level flowchart of a semi-automatic daylight sensor calibration procedure completed by a user to enable the daylight sensor of FIG. 1 to determine an appropriate gain for use during normal operation.

FIG. 8 is a simplified high-level flowchart of a semi-automatic daylight sensor calibration procedure 450 completed by a user to enable the daylight sensor 120 to determine the appropriate gain M for use during normal operation. During the semi-automatic daylight sensor calibration procedure 450, the controller 230 of the daylight sensor 120 executes the gain calibration procedure 500, which will be described in greater detail below with reference to FIGS. 9A and 9B. To begin the semi-automatic daylight sensor calibration procedure 450, the user places the daylight sensor 120 on the task surface 136 with the lens 128 facing the ceiling 132 and the lighting load 104 at step 454. At step 456, the user presses the calibration button 150 on the front surface of the daylight sensor 120 to cause the daylight sensor to enter a calibration mode. The user then adjusts the present intensity $L_{PRES}$ of the lighting load 104 to achieve the desired light intensity on the task surface 136 (i.e., the target total task surface light intensity $L_{TRGT-TASK}$). Specifically, the user actuates the raise and lower buttons 152, 154 on the front surface of the daylight sensor 120 at step 458 to cause the daylight sensor 120 to transmit raise and lower commands to the dimmer switch 110, respectively. For example, the user may adjust the present intensity $L_{PRES}$ of the lighting load 104 until the visual indicators of the linear array 158 on the daylight sensor 120 indicates that the total light intensity $L_{T-SNSR}$ measured by the daylight sensor (i.e., the total light intensity $L_{T-TASK}$ on the task surface 136 since the daylight sensor is positioned on the task surface) is at the target total task surface light intensity $L_{TRGT-TASK}$.

After the total light intensity $L_{T-TASK}$ on the task surface 136 has been adjusted to the target total task surface light intensity $L_{TRGT-TASK}$ at step 458, the user presses the calibration button 150 again at step 460. At this time, the daylight sensor 120 automatically controls the intensity of the lighting load 104 to different intensities and makes various measurements from the position on the task surface 136 at step 462 (as will be described in greater detail below with reference to FIGS. 9A and 9B). When finished, the daylight sensor 120 cycles the linear array 158 of visual indicators at step 464 to signal that the user should mount the daylight sensor 120 to the ceiling 132 at step 466. After the user mounts the daylight sensor 120 to the ceiling 132 at step 466 and presses the calibration button 150 once again at step 468, the daylight sensor 120 controls the intensity of the lighting load 104 to different intensities and makes more measurements from the position on the ceiling 132 at step 470 (as will be described in greater detail below with reference to FIGS. 9A and 9B). Finally, the daylight sensor 120 blinks the linear array 158 of visual indicators at step 472 and exits the calibration mode, and the semi-automatic daylight sensor calibration procedure 450 ends. Rather than actuating the calibration button 150 when the daylight sensor 120 is mounted to the ceiling 132 at step 468, the user could alternatively shine a laser pointer into the laser-pointer receiving opening 156 in the front surface of the daylight sensor. In addition, the daylight sensor 120 could alternatively illuminate the lens 128 rather than illuminating the linear array 158 of visual indicators.

Figure 9A:
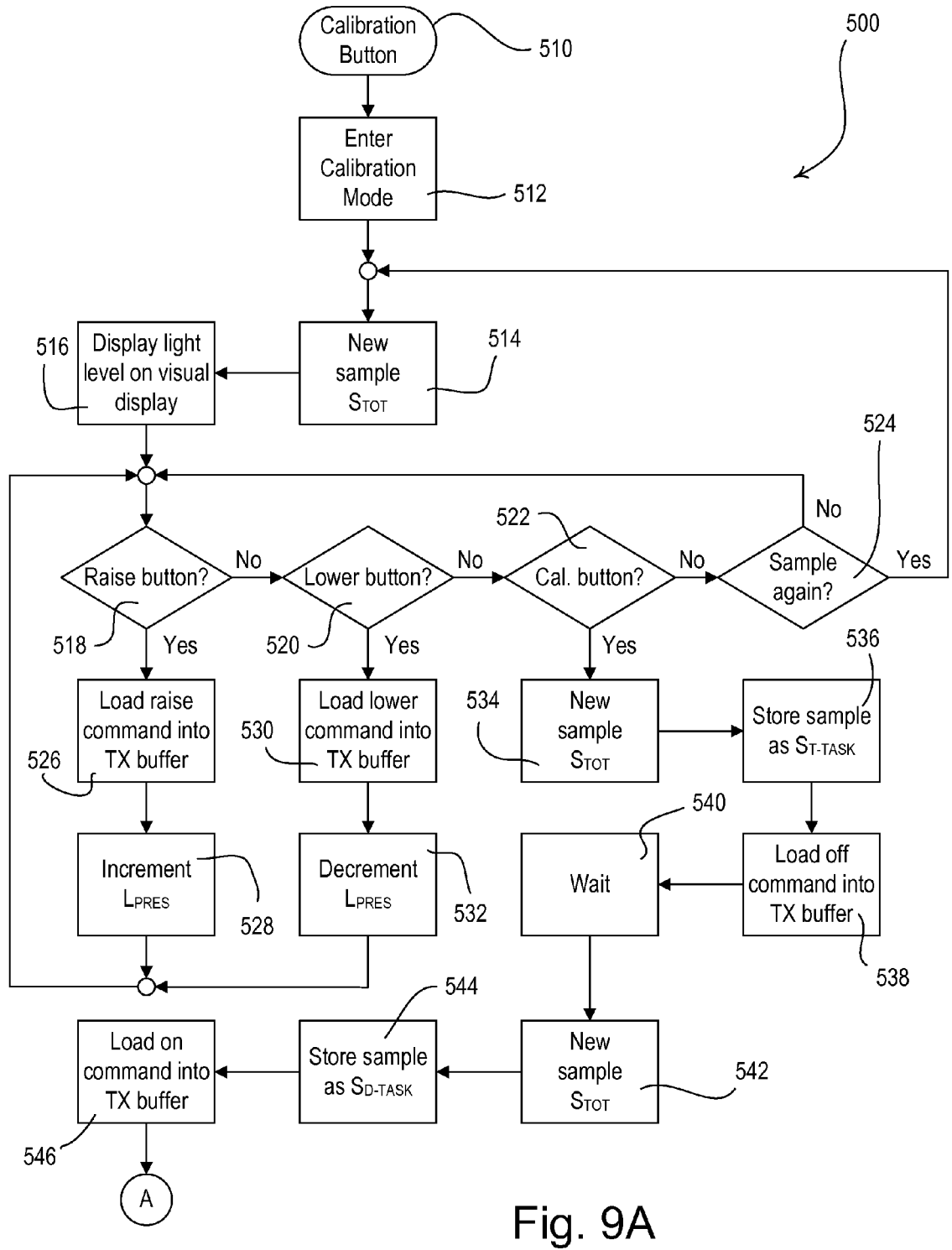
FIGS. 9A and 9B are flowcharts of a gain calibration procedure executed by the controller of the daylight sensor of FIG. 1.
Figure 9B:
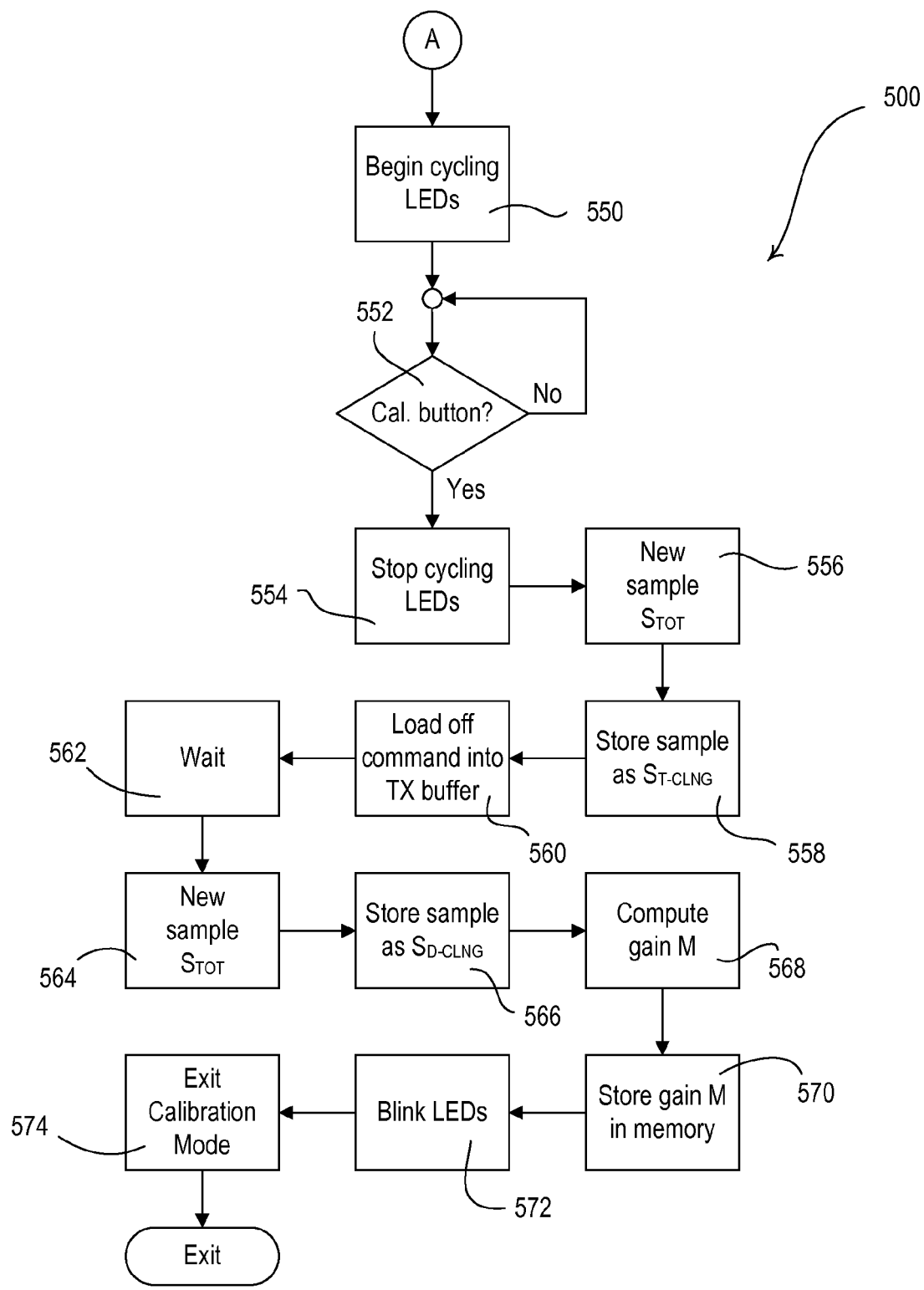

FIGS. 9A and 9B are flowcharts of the gain calibration procedure 500 executed by the controller 230 of the daylight sensor 120 during the semi-automatic daylight sensor calibration procedure 450 of FIG. 8. The controller 230 executes the gain calibration procedure 500 in response to an actuation of the calibration button 150 at step 510. As previously mentioned, the user places the daylight sensor 120 on task surface 136 before actuating the calibration button 150 after which the controller 230 enters the calibration mode at step 512. The controller 230 samples the total light intensity control signal $V_{TOT}$ at step 514 to generate a new total light intensity sample $S_{TOT}$, and displays the visual representation of the total light intensity $L_{T-SNSR}$ measured by the daylight sensor 120 on the LEDs 242 at step 516. Next, the controller 230 determines if the raise button 152, the lower button 154, or the calibration button 150 are pressed at step 518, 520, 522, respectively. If none of the buttons 150, 152, 154 are pressed, the controller 230 waits until the sampling time at step 524 (i.e., every one to three seconds), after which the controller samples the total light intensity control signal $V_{TOT}$ again at step 514 and updates the visual representation of the total light intensity $L_{T-SNSR}$ measured by the daylight sensor 120 on the LEDs 242 at step 516.

If the raise button 152 is pressed at step 518, the controller 230 loads a raise command into the TX buffer at step 526, increments the present intensity $L_{PRES}$ at step 528, and checks again to see if any buttons 150, 152, 154 are actuated at steps 518, 520, 522. If the lower button 154 if pressed at step 520, the controller 230 loads a lower command into the TX buffer at step 530 and decrements the present intensity $L_{PRES}$ at step 532. When the calibration button 150 is actuated at step 522, the controller 230 stops checking to see if the buttons 150, 152, 154 are actuated at steps 518, 520, 522. The controller 230 samples the total light intensity control signal $V_{TOT}$ at step 534 to generate a new total light intensity sample $S_{TOT}$, which is representative of the combined (i.e., total) light intensity on the task surface 136. The controller 230 stores the new sample $S_{TOT}$ in the memory 246 as a total-at-task-surface light intensity sample $S_{T-TASK}$ at step 536 and loads a digital message having an off command into the TX buffer at step 538, such that the dimmer switch 110 will turn off the lighting load 104. The controller 230 waits for the lighting load 104 to be turned off at step 540 and samples the total light intensity control signal $V_{TOT}$ at step 542 to generate a new total light intensity sample $S_{TOT}$, which is representative of the intensity of only the daylight on the task surface 136. At step 544, the controller 230 stores the new sample $S_{TOT}$ in the memory 246 as a daylight-at-task-surface light intensity sample $S_{D-TASK}$. The controller 230 loads a digital message having an on command into the TX buffer at step 546, such that the dimmer switch 110 will turn the lighting load 104 back on.

Referring to FIG. 9B, the controller 230 now begins cycling the LEDs 242 at step 550 to indicate that the user should now mount the daylight sensor 120 to the ceiling 132. After the user has mounted the daylight sensor to the ceiling 132 and has actuated the calibration button 150 at step 552, the controller 230 stops cycling the LEDs 242 at step 554 and samples the total light intensity control signal $V_{TOT}$ at step 556 to generate a new total light intensity sample $S_{TOT}$, which is representative of the combined light intensity at the daylight sensor 120 when mounted to the ceiling 132. The controller 230 stores the new total light intensity sample $S_{TOT}$ in the memory 246 as a total-at-ceiling light intensity sample $S_{T-CLNG}$ at step 558 and loads a digital message having an off command into the TX buffer at step 560, such that the dimmer switch 110 will turn off the lighting load 104. The controller 230 waits for the lighting load 104 to be turned off at step 562 and samples the total light intensity control signal $V_{TOT}$ at step 564 to generate a new total light intensity sample $S_{TOT}$, which is representative of the intensity of only the daylight present at the daylight sensor 120 when mounted to the ceiling 132. At step 566, the controller 230 stores the new total light intensity sample $S_{TOT}$ in the memory 246 as a daylight-at-ceiling light intensity sample $S_{D-CLNG}$.

At step 568, the controller 230 calculates the gain M using the total-at-task-surface light intensity sample $S_{T-TASK}$, the daylight-at-task-surface light intensity sample $S_{D-TASK}$, the total-at-ceiling light intensity sample $S_{T-CLNG}$, and the daylight-at-ceiling light intensity sample $S_{D-CLNG}$, e.g., $$M = S_{D-TASK}/S_{D-CLNG} \quad \text{(Equation 4)}$$

where $S_{E-TASK}$ represents the intensity of only the electric light from the lighting load 104 on the task surface 136, i.e., $$S_{E-TASK} = S_{T-TASK} - S_{D-TASK} \quad \text{(Equation 5)}$$

and $S_{E-CLNG}$ represents the light intensity of only the electric light from the lighting load that is reflected onto the daylight sensor 120 mounted to the ceiling 132, i.e., $$S_{E-CLNG} = S_{T-CLNG} - S_{D-CLNG} \quad \text{(Equation 6)}$$

The controller 230 then stores the newly-calculated gain M in the memory 246 at step 570, such that the gain may be used by the controller to determine the new intensity $L_{NEW}$ during the control procedure 300 shown in FIG. 7. The controller 230 then blinks the LEDs 242 at step 572 and exits the calibration mode at step 574, before the gain calibration procedure 500 exits.

Figure 10:
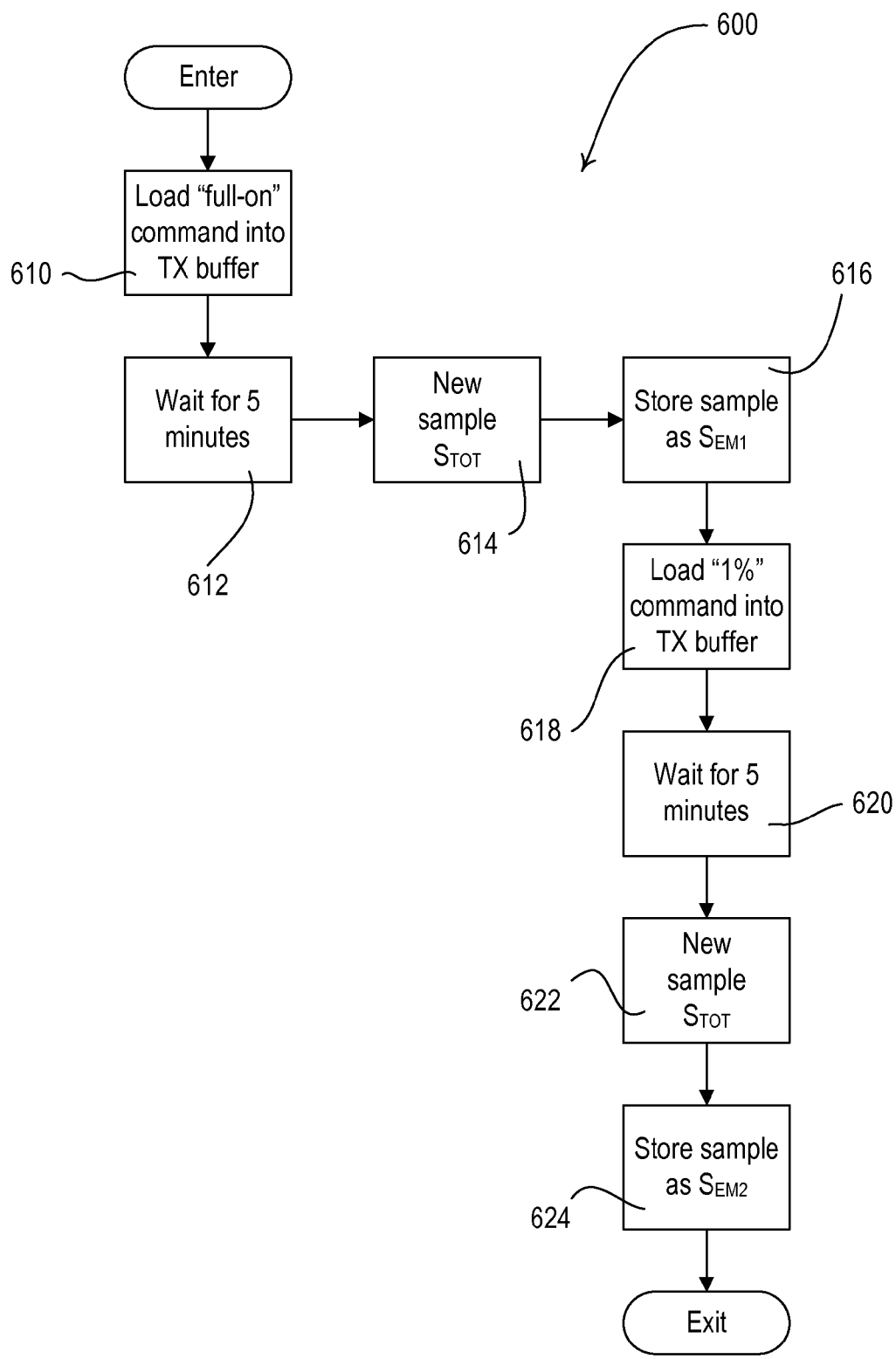
FIG. 10 is a simplified flowchart of a midnight calibration procedure executed by the controller of the daylight sensor of FIG. 1.

FIG. 10 is a simplified flowchart of the midnight calibration procedure 600. The midnight calibration procedure 600 is executed from the control procedure 400 when the midnight calibration flag is set (at step 424) and the filtered total light intensity sample $FS_{TOT}$ is less than the midnight calibration threshold intensity $S_{TH-MID}$ (at step 426) as described above with reference to FIG. 7. The midnight calibration procedure 600 is also called from a midnight calibration offset procedure 800, which is executed if the midnight calibration timeout timer expires, as will be described in greater detail below.

Referring to FIG. 10, the controller 230 first loads a digital message having a "high-end" command (i.e., a command to adjust the intensity of the lighting load 104 to 100%) into the TX buffer at step 610, such that the dimmer switch 110 will control the intensity of the lighting load to the first predetermined intensity level $L_{HE}$ (i.e., 100%). The controller 230 waits for an appropriate time period $T_W$ (e.g., approximately five minutes) at step 612 before sampling the total light intensity control signal $V_{TOT}$ to generate a new total light intensity sample $S_{TOT}$ at step 614. For example, some types of lighting loads 104 (e.g., fluorescent lamps) may require an amount of time until the intensity of the light emitted by the lamp reaches a steady-state condition. At step 616, the controller stores the new total light intensity sample $S_{TOT}$ in the memory 246 as the first midnight calibration light intensity sample $S_{EM1}$. Next, the controller 230 loads a digital message having a "low-end" command into the TX buffer at step 618, such that the dimmer switch 110 will control the intensity of the lighting load 104 to the second predetermined intensity level $L_{LE}$ (i.e., 1%). The controller 230 then waits for the time period $T_W$ (i.e., approximately five minutes) at step 620, samples the total light intensity control signal $V_{TOT}$ again to generate another new total light intensity sample $S_{TOT}$ at step 622, and stores the new total light intensity sample $S_{TOT}$ at the second midnight calibration light intensity sample $S_{EM2}$ at step 624, before the midnight calibration procedure 600 exits.

Figures 11, 12:
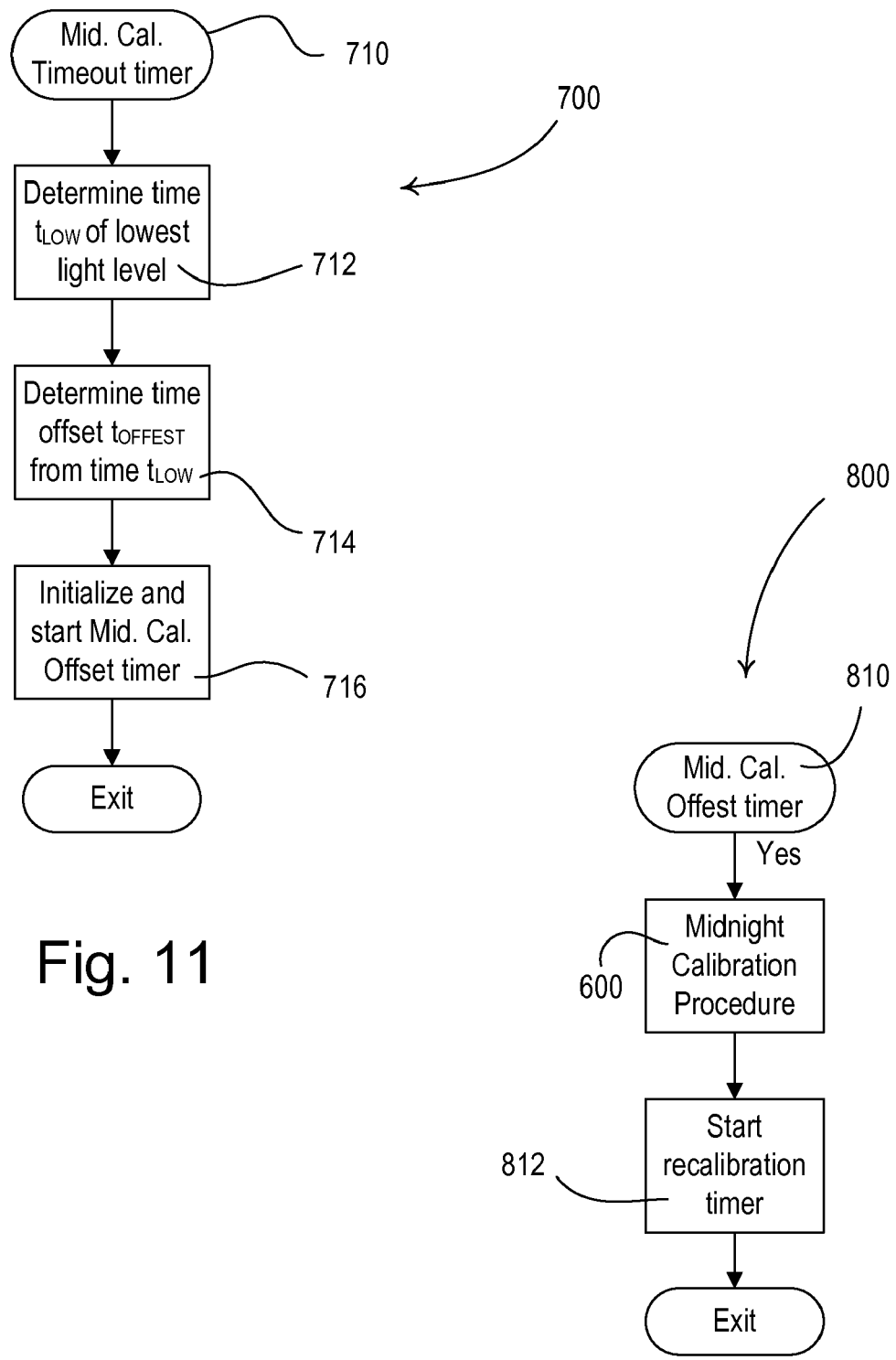
FIG. 11 is a simplified flowchart of a midnight calibration timeout procedure executed by the controller of the daylight sensor of FIG. 1.
FIG. 12 is a simplified flowchart of a midnight calibration offset procedure executed by the controller of the daylight sensor of FIG. 1.

FIG. 11 is a simplified flowchart of a midnight calibration timeout procedure 700, which is executed by the controller 230 when the midnight calibration timeout timer expires at step 710. At step 712, the controller 230 determines the time of day $t_{LOW}$ during the last twenty-four hours at which total light intensity $L_{T-SNSR}$ at the daylight sensor 120 reached a minimum magnitude using the historical data stored in the memory 246. At step 714, the controller 230 determines the amount of time (i.e., an offset time $t_{OFFSET}$ in minutes) until this time of day $t_{LOW}$ during the next twenty-four hours, e.g., $$t_{OFFSET} = T_{DAY} - (t_{PRES} - t_{LOW}) \quad \text{(Equation 7)}$$

where $t_{PRES}$ is the present time (in minutes) and $T_{DAY}$ is the number of seconds in a day (i.e., 1440 minutes). At step 716, the controller 230 initializes a midnight calibration offset timer to the offset time $t_{OFFSET}$ determined at step 714 and starts the timer decreasing in value with respect to time, before the midnight calibration timeout procedure 700 exits. The controller 230 will execute a midnight calibration offset procedure 800 when the midnight calibration offset timer expires.

FIG. 12 is a simplified flowchart of a midnight calibration offset procedure 800, which is executed by the controller 230 when the midnight calibration offset timer expires at step 810. The controller 230 first executes the midnight calibration procedure 600, after which the controller initializes the recalibration timer to two days and starts the recalibration timer at step 812, before the midnight calibration offset procedure 800 exits.

Figure 13:
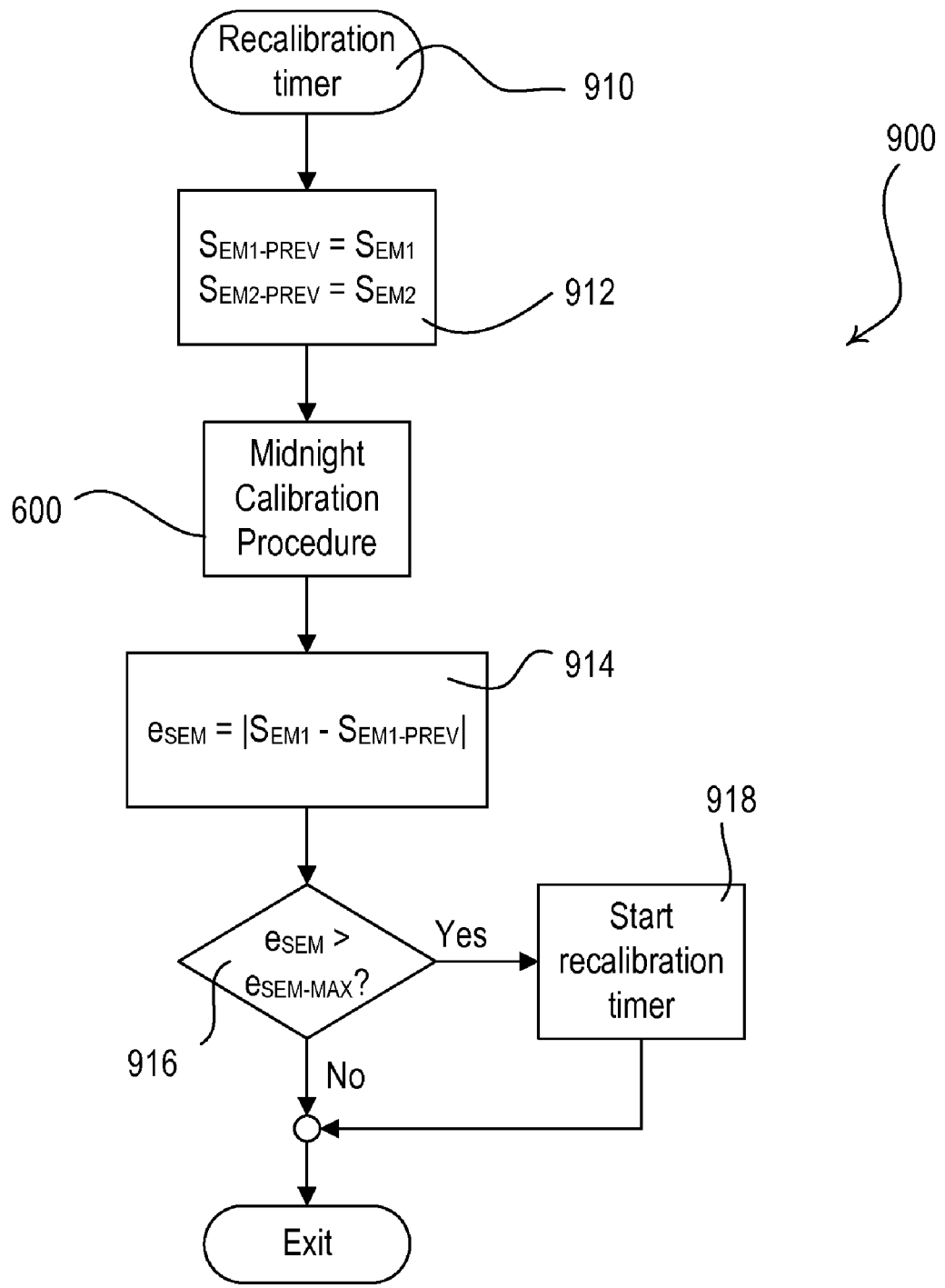
FIG. 13 is a simplified flowchart of a recalibration procedure executed by the controller of the daylight sensor of FIG. 1.

FIG. 13 is a simplified flowchart of a recalibration procedure 900, which is executed by the controller 230 when the recalibration timer expires at step 910. The controller 230 first stores the midnight calibration light intensity samples $S_{EM1}$, $S_{EM2}$ as previous midnight calibration light intensity samples $S_{EM1-PREV}$, $S_{EM2-PREV}$ at step 912. The controller 230 then executes the midnight calibration procedure 600 and calculates an error $e_{SEM}$ between the previous first midnight calibration light intensity sample $S_{EM1-PREV}$ and the new first midnight calibration light intensity sample $S_{EM1}$ at step 914, i.e., $$e_{SEM} = |S_{EM1} - S_{EM1-PREV}| \quad \text{(Equation 8)}$$

If the error $e_{SEM}$ is greater than a maximum error $e_{SEM-MAX}$ at step 916, the controller 230 starts the recalibration timer at step 918, before the recalibration procedure 900 exits. If the error $e_{SEM}$ is not greater than a maximum error $e_{SEM-MAX}$ at step 916, the recalibration procedure 900 simply exits. The daylight sensor 120 could additionally execute the recalibration procedure 900 periodically (e.g., once a month) to account for changes in the light intensity generated by the lighting load 104, for example, due to the age of the lighting load (i.e., the daylight sensor 120 could provide for lumen maintenance).

Figure 14:
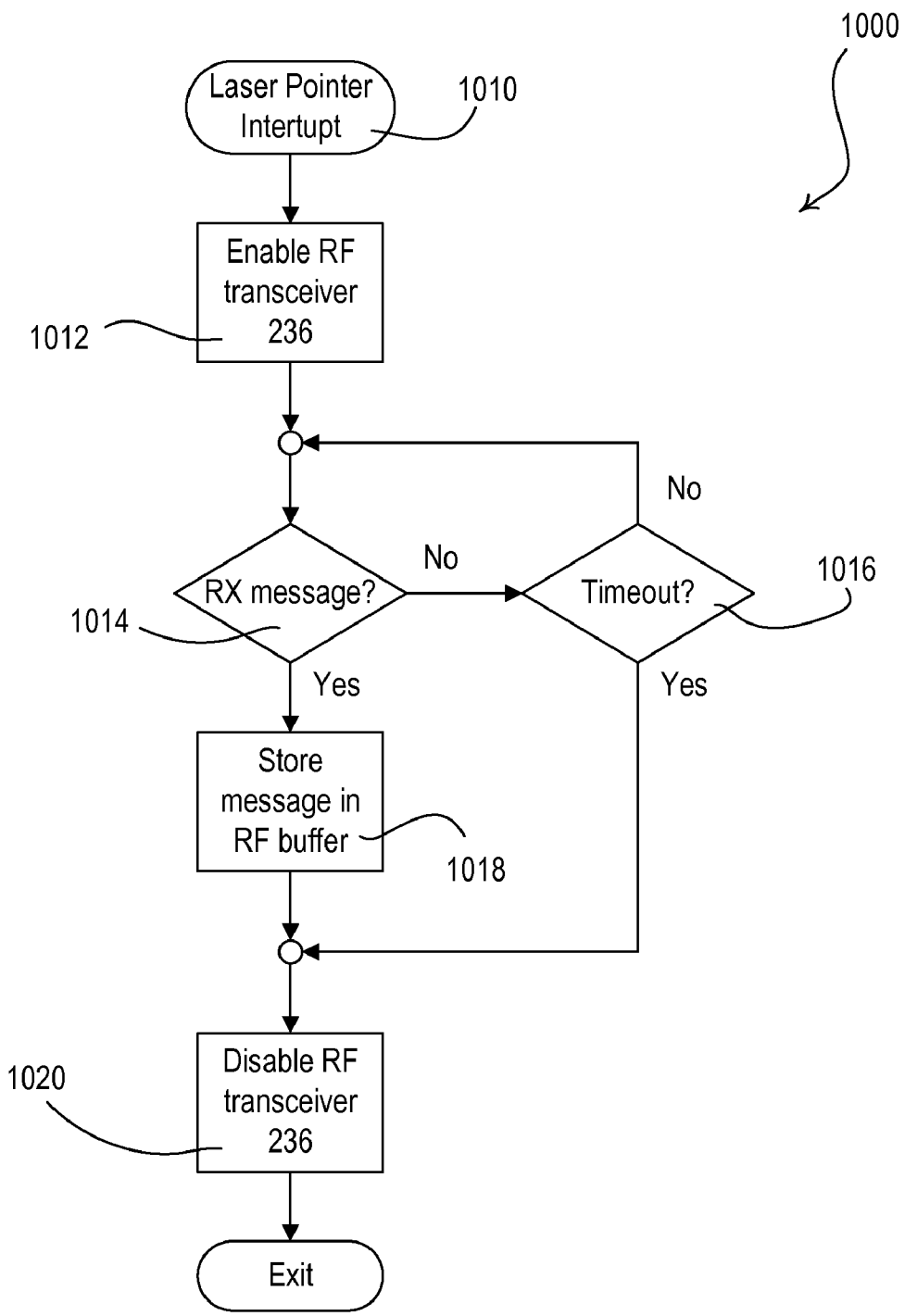
FIG. 14 is a simplified flowchart of a laser pointer interrupt procedure executed by the controller of the daylight sensor of FIG. 1.

FIG. 14 is a simplified flowchart of a laser pointer interrupt procedure 1000 executed by the controller 230 in response to the laser pointer circuit 244 detecting light from a laser pointer when the controller is in the sleep mode. Specifically, when the laser pointer control signal $V_{LASER}$ is pulled high towards the battery voltage $V_{BATT}$ at step 1010, the controller 230 first enables the RF transceiver 236 via the RF enable control signal $V_{RF\_ENABLE}$ at step 1012. The controller 230 then waits until a digital message is received at step 1014 or a timeout expires at step 1016. If a digital message is received at step 1014 (e.g., from the dimmer switch 110), the controller 230 stores the received digital message in a receive (RX)

buffer at step 1018, such that the controller 230 may process the received digital message at a later time. The controller 230 then disables the RF transceiver 236 via the RF enable control signal $V_{RF\_ENABLE}$ at step 1020, and the laser pointer interrupt procedure 1000 exits. If the timeout expires at step 1016 before a digital message is received at step 1014, the controller 230 simply disables the RF transceiver 236 at step 1020, before the laser pointer interrupt procedure 1000 exits.

Alternatively, the dimmer switch 110 of the first embodiment could be replaced with an electronic switch operable to simply toggle the lighting load 104 on and off. The electronic switch could be adapted to simply turn the lighting load 104 on when the measured total light intensity $L_{T\text{-}SNSR}$ drops below a predetermined threshold and turn the lighting load off when the measured total light intensity $L_{T\text{-}SNSR}$ rises above approximately the predetermined threshold (e.g., using some hysteresis). The daylight sensor 120 could simply cause the electronic switch to control the lighting load to a single predetermined intensity (i.e., full-on or 100% of the maximum possible intensity of the lighting load) as part of the midnight calibration procedure 600, and thus would only store a single midnight calibration light intensity sample (e.g., the first midnight calibration light intensity sample $S_{EM1}$).

Figure 15A:
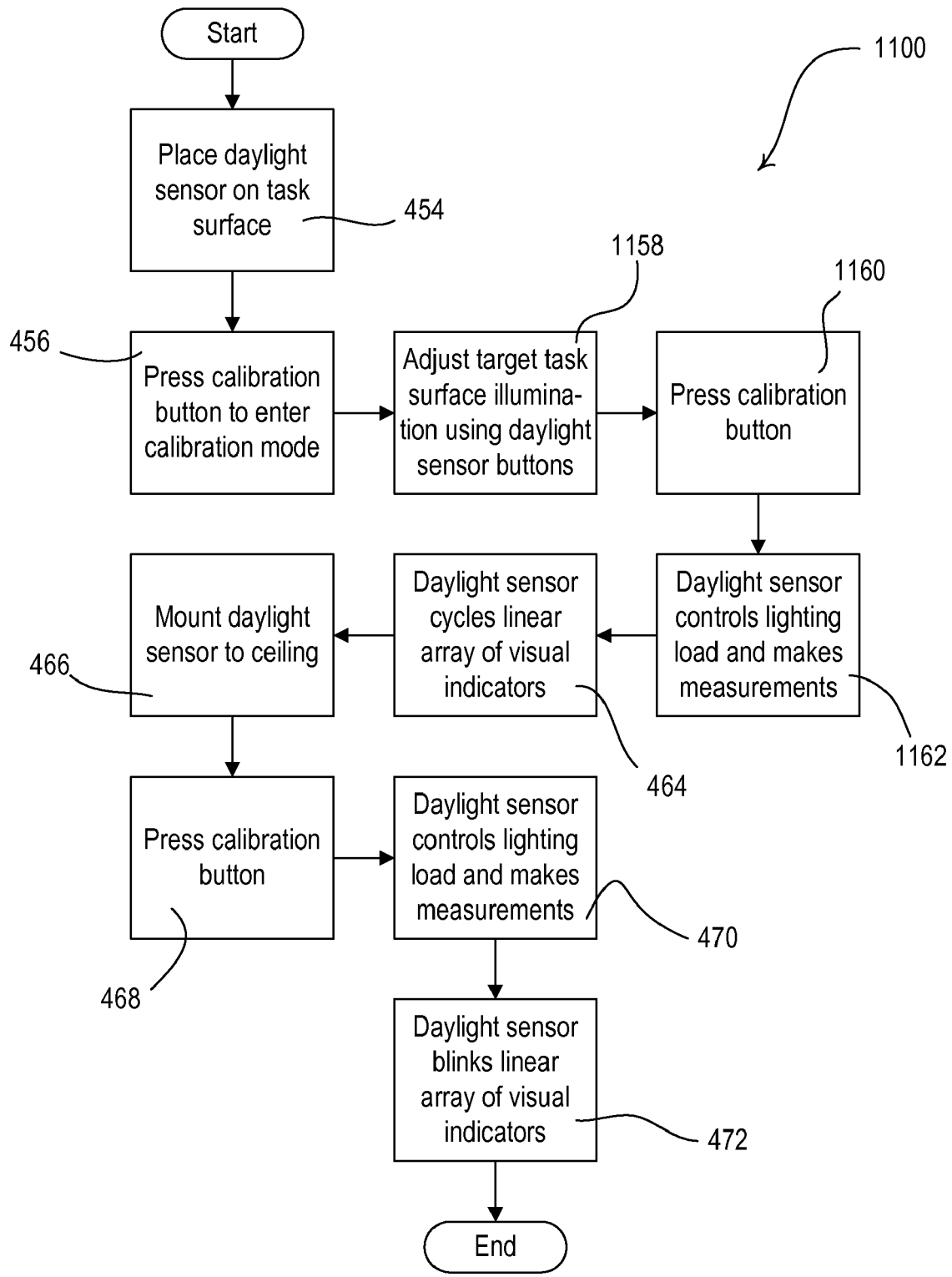
FIG. 15A is a simplified high-level flowchart of a semi-automatic daylight sensor calibration procedure completed by a user to enable the daylight sensor of FIG. 1 to determine an appropriate gain according to a second embodiment of the present invention.

FIG. 15A is a simplified high-level flowchart of a semi-automatic daylight sensor calibration procedure 1100 completed by a user to enable the daylight sensor 120 to determine the appropriate gain M according to a second embodiment of the present invention. The semi-automatic daylight sensor calibration procedure 1100 is very similar to the semi-automatic daylight sensor calibration procedure 450 of the first embodiment (as shown in FIG. 8). However, the user does not adjust the present intensity $L_{PRES}$ of the lighting load 104 to the desired light intensity $L_{SP}$ by actuating the raise and lower buttons 152, 154 on the front surface of the daylight sensor 120 (as in step 458 of the semi-automatic daylight sensor calibration procedure 450 of the first embodiment). Rather, the user actuates the raise and lower buttons 152, 154 on the front surface of the daylight sensor 120 to change which of the visual indicators of the linear array 158 is illuminated to choose a desired target illumination level for the task surface 136 at step 1158. For example, the user may select a desired target illumination level of 70 foot-candles (FC) for the task surface 136 by actuating the raise and lower buttons 152, 154 until the seventh visual indicator of the linear array 158 is illuminated. The user then presses the calibration button 150 at step 1160 and the daylight sensor 120 automatically adjusts the intensity of the lighting load 104 at step 1162 such that the illumination level on the task surface 136 is equal to the desired target illumination level as chosen in step 1158. At step 1162, the daylight sensor 120 also makes the appropriate measurements from the position on the task surface 136 that are need to compute the gain M.

Rather than first placing the daylight sensor 120 on the task surface 136 at step 454 and then mounting the daylight sensor to the ceiling 132 at step 466 of the semi-automatic daylight sensor calibration procedure 450 of the first embodiment (as shown in FIG. 8), two separate daylight sensors could be used to calibrate the lighting control system 100. For example, a first (and permanent) daylight sensor could be installed on the ceiling 132, and a second (and temporary) daylight sensor could be placed on the task surface 136. The user only needs to press the calibration button on the second daylight sensor once and both daylight sensors will communicate with the dimmer switch 110, such that the first daylight sensor is operable to calculate the gain.

Figure 15B:
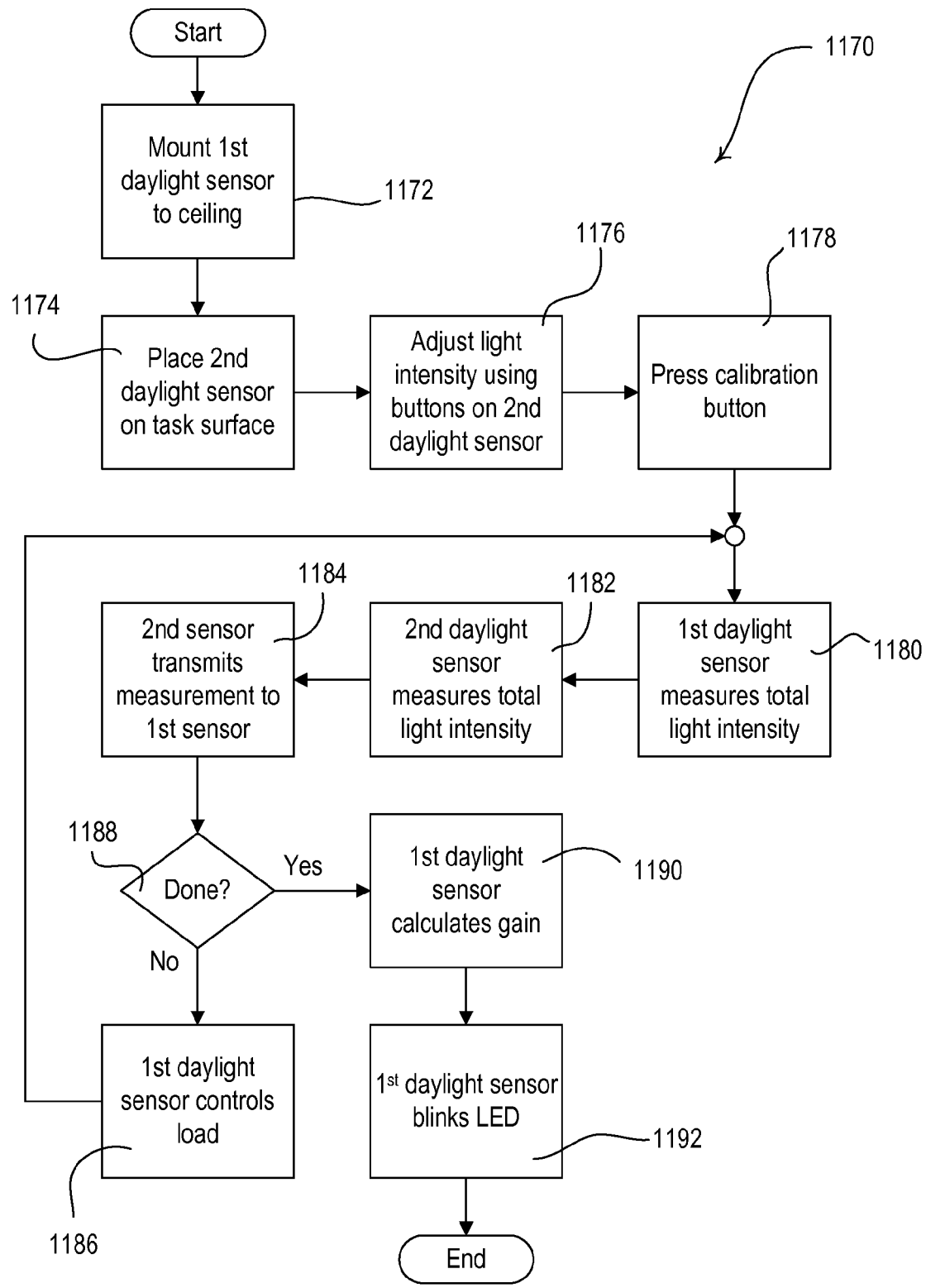
FIG. 15B is a simplified high-level flowchart of a semi-automatic daylight sensor calibration procedure completed by a user to enable the daylight sensor of FIG. 1 to determine an appropriate gain according to a third embodiment of the present invention.

FIG. 15B is a simplified high-level flowchart of a semi-automatic daylight sensor calibration procedure 1170 completed by a user to enable a first daylight sensor to determine the appropriate gain M according to a third embodiment of the present invention. The user first mounts the first daylight sensor to the ceiling 132 at step 1172, and then places a second daylight sensor on the task surface 136 at step 1174. The user then adjusts the present light intensity $L_{PRES}$ of the lighting load 104 to achieve the target total light intensity $L_{TRGT\text{-}TASK}$ on the task surface 136 at step 1176 using, for example, the raise and lower buttons 152, 154 of the second daylight sensor. After the user actuates the calibration button 150 on the second daylight sensor once at step 1178, the first daylight sensor measures the total light intensity $L_{T\text{-}SNSR}$ at the first daylight sensor at step 1180, the second daylight sensor measures the total light intensity $L_{T\text{-}SNSR}$ at the second daylight sensor at step 1182, and the second daylight sensor transmits values representative of the total light intensity $L_{T\text{-}SNSR}$ to the first daylight sensor at step 1184. The first dimmer switch 110 then controls the intensity of the lighting load 104 to the appropriate light intensity at step 1186, and the procedure loops until the first daylight sensor has collected the appropriate measurements (e.g., measurements with the lighting load at 100% and at 0%) at step 1188. At that time, the first daylight sensor calculates the gain M at step 1190 and blinks the one of the LEDs 242 at step 1192 to indicate that the daylight sensor calibration procedure 1170 is complete, before the daylight sensor calibration procedure exits. During the daylight sensor calibration procedure 1170, the user only actuates the calibration button 150 once (at step 1178).

As described in regards to first, second, and third embodiments, the daylight sensor 120 is operable to determine and transmit the new intensity $L_{NEW}$ of the lighting load 104 and to execute the various methods of the present invention. However, the daylight sensor 120 could alternatively transmit the magnitude of the total light intensity control signal $V_{TOT}$ to the dimmer switch 110, and the dimmer switch could calculate the new intensity $L_{NEW}$ of the lighting load 104 and execute the various methods of the present invention.

According to a fourth embodiment of the present invention, the daylight sensor 120 is operable to transmit a digital message (i.e., a wireless signal) including a value representative of the total light intensity $L_{T\text{-}SNSR}$ measured by the daylight sensor (e.g., in foot-candles) to the dimmer switch 110. The dimmer switch 110 then controls the present intensity $L_{PRES}$ of the lighting load 104 in response to received digital messages including the total light intensity $L_{T\text{-}SNSR}$ as measured by the daylight sensor 120, so as to control the total light intensity $L_{T\text{-}TASK}$ on the task surface 136 towards a target total task surface light intensity $L_{TRGT\text{-}TASK}$ (e.g., approximately fifty foot-candles). The dimmer switch 110 uses a present dimming percentage $d_{PRES}$ to control the present light intensity $L_{PRES}$ of the lighting load 104. The present dimming percentage $d_{PRES}$ is calculated in response to the received digital messages and a target task surface light intensity value $L_{TRGT\text{-}TASK}$ during a load control procedure 1800, which will be described in greater detail below with reference to FIG. 23. For example, the present dimming percentage $d_{PRES}$ may be a number between zero and one. The controller 214 may apply the present dimming percentage $d_{PRES}$ to different dimming curves depending upon the load type of the lighting load 104 (i.e., incandescent, fluorescent, etc.) to determine the actual new present intensity $L_{PRES}$ of the lighting load. The dimmer switch 110 of the fourth embodiment uses two different gains (e.g., a daylight gain $G_D$ and an electric light gain $G_E$) to calculate the present dimming percentage $d_{PRES}$ to thus control the present intensity $L_{PRES}$ of the lighting load 104. The daylight gain $G_D$ is representative of the ratio between the light intensity $L_{D\text{-}TASK}$ on the task surface 136 from only daylight and the light intensity $L_{D\text{-}SNSR}$ measured by the daylight sensor 120 from only daylight (i.e., $G_D = L_{D\text{-}TASK}/L_{D\text{-}SNSR}$). The electric light gain $G_E$ is representative of the ratio between the light intensity $L_{E\text{-}TASK}$ on the task surface 136 from only the lighting load 104 and the light intensity $L_{E\text{-}SNSR}$ measured by the daylight sensor 120 from only the lighting load (i.e., $G_E = L_{E\text{-}TASK}/L_{E\text{-}SNSR}$).

Figure 16:
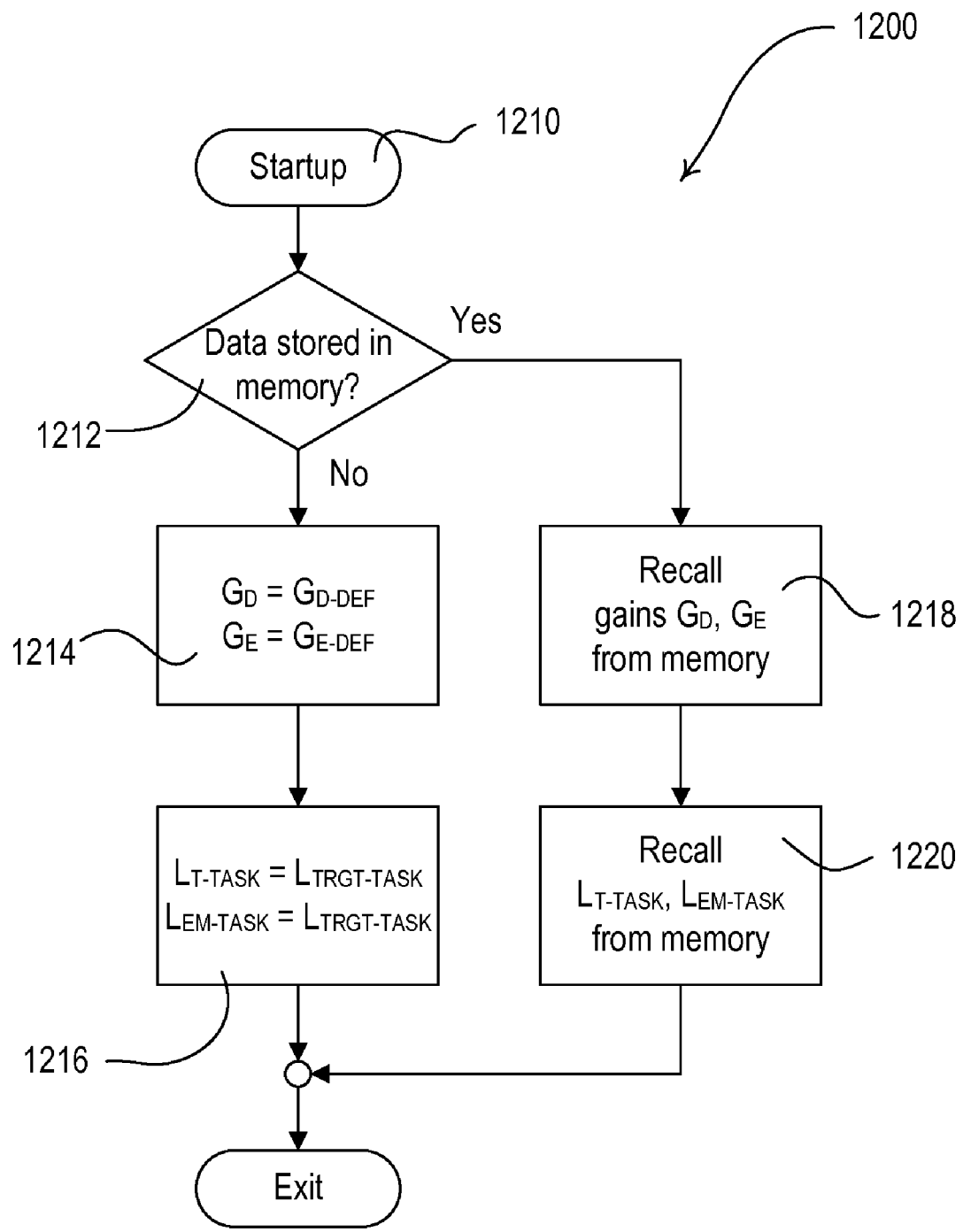
FIG. 16 is a simplified flowchart of a startup procedure executed by the controller of the daylight sensor of FIG. 1 according to a fourth embodiment of the present invention.

FIG. 16 is a simplified flowchart of a startup procedure 1200 executed by the controller 230 of the daylight sensor 120 each time the controller is powered up at step 1210 according to the fourth embodiment of the present invention. If there is not operational data (i.e., the daylight gain $G_D$ and an electric light gain $G_E$) stored in the memory 246 at step 1212, the controller 230 sets the daylight gain $G_D$ equal to a default daylight gain value $G_{D\text{-}DEF}$ (e.g., approximately 1.5) and the electric light gain $G_E$ equal to a default electric light gain value $G_{E\text{-}DEF}$ (e.g., a large number, such as 256) at step 1214. The default daylight gain value $G_{D\text{-}DEF}$ is an assumption of a daylight gain of a typical room in which the daylight sensor may be installed. In addition, the controller 230 of the daylight sensor 120 sets total light intensity $L_{T\text{-}TASK}$ on the task surface 136 and a maximum light intensity $L_{EM\text{-}TASK}$ on the task surface 136 from only the lighting load 104 equal to the total task surface light intensity $L_{TRGT\text{-}TASK}$ at step 1516. If there is operational data stored in the memory 246 at step 1212, the controller 230 simply recalls the daylight gain $G_D$ and the electric light gain $G_E$ from the memory 246 at step 1218, and recalls the stored light intensities $L_{T\text{-}TASK}$, $L_{EM\text{-}TASK}$ from the memory at step 1220, before the startup procedure 1200 exits.

Figure 17:
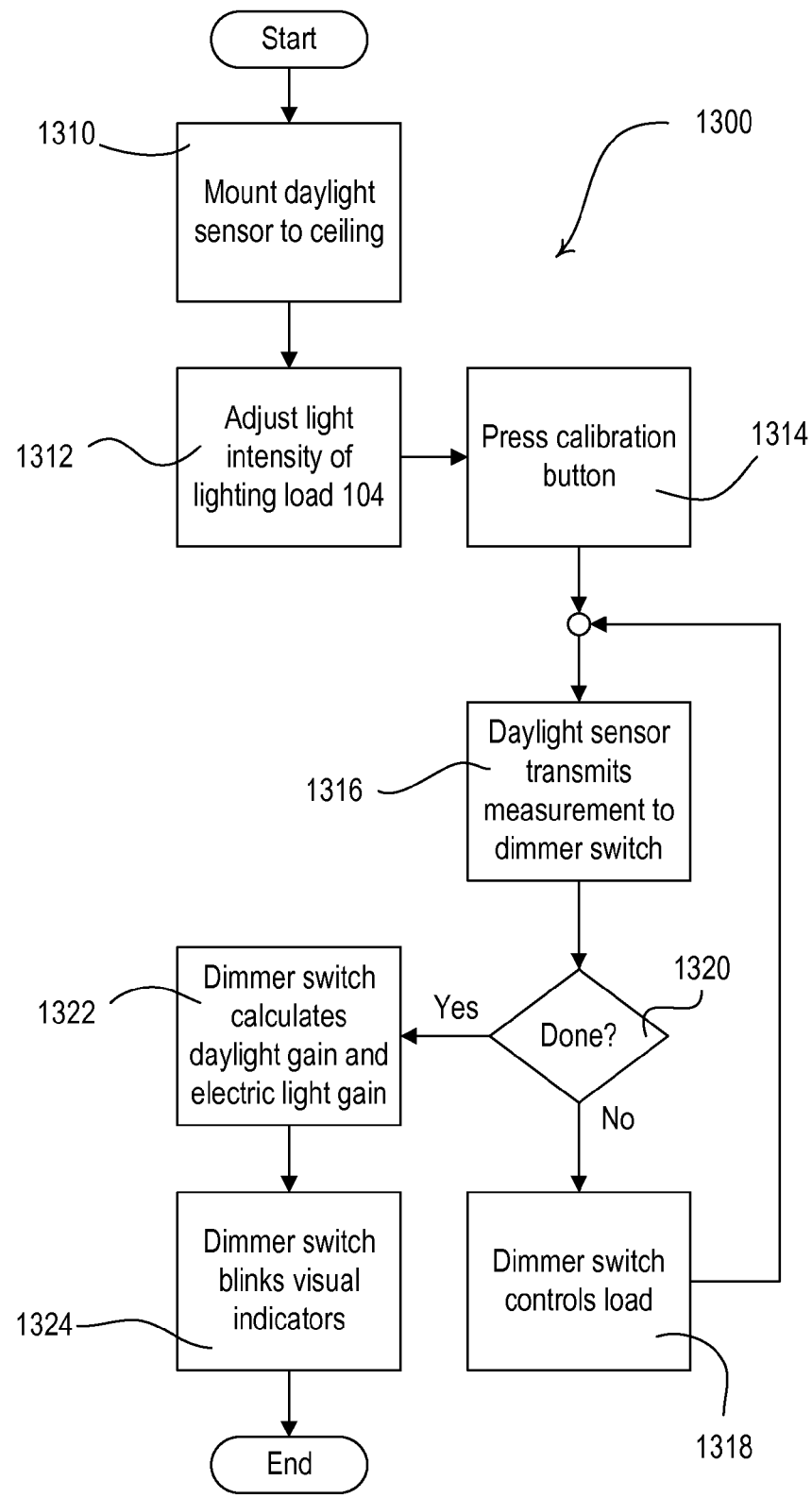
FIG. 17 is a simplified high-level flowchart of a "single-button-press" daylight sensor calibration procedure completed by a user to enable the dimmer switch of FIG. 1 to determine a daylight gain and an electric light gain according to the third embodiment of the present invention.

FIG. 17 is a simplified high-level flowchart of a "single-button-press" daylight sensor calibration procedure 1300 completed by a user to enable the dimmer switch 110 to determine the daylight gain $G_D$ and the electric light gain $G_E$. During the daylight sensor calibration procedure 1300, the controller 230 of the daylight sensor 120 executes a "single-button-press" calibration button procedure 1400 (which will be described in greater detail below with reference to FIG. 18), and the controller 214 of the dimmer switch 110 executes a gain calibration procedure 1600 (which will be described in greater detail below with reference to FIG. 20). The user first mounts the daylight sensor 120 to the ceiling 132 at step 1310, and then adjusts the present intensity $L_{PRES}$ of the lighting load 104 to achieve the target total light intensity $L_{TRGT\text{-}TASK}$ on the task surface 136 at step 1312 using the raise and lower buttons 152, 154 of the daylight sensor or the intensity adjustment actuator 116 of the dimmer switch 110. After the user actuates the calibration button 150 on the daylight sensor 120 once at step 1314, the daylight sensor 120 transmits the values representative of the total light intensity $L_{T\text{-}SNSR}$ to the dimmer switch at step 1316. The dimmer switch 110 then automatically controls the intensity of the lighting load 104 to different intensities at step 1318 and the daylight sensor 120 transmits the values representative of the total light intensity $L_{T\text{-}SNSR}$ at the different intensities to the dimmer switch at step 1316. When the dimmer switch 110 has collected the appropriate measurements at step 1320 (e.g., measurements with the lighting load at 100% and at 0%), the dimmer switch calculates the daylight gain $G_D$ and the electric light gain $G_E$ at step 1322 and blinks the visual indicators 118 at step 1324 to indicate that the daylight sensor calibration procedure 1300 is complete, before the daylight sensor calibration procedure exits. During the single-button-press daylight sensor calibration procedure 1300, the user only actuates the calibration button 150 once (at step 1314), thus providing a very simple calibration procedure.

Alternatively, the user could place the daylight sensor 120 on the task surface 136 and adjust the present intensity $L_{PRES}$ of the lighting load 104 until the visual indicators of the linear array 158 on the daylight sensor 120 indicates that the total light intensity $L_{T\text{-}TASK}$ on the task surface 136 is at the target total task surface light intensity $L_{TRGT\text{-}TASK}$ prior to mounting the daylight sensor on the ceiling 132. In addition, two separate daylight sensors could be used as in the calibration procedure 1170 of the third embodiment (as shown in FIG. 15B), however both daylight sensors would transmit the measured light intensity values to the dimmer switch 110, which would calculate the daylight gain $G_D$ and the electric light gain $G_E$.

Figure 18:
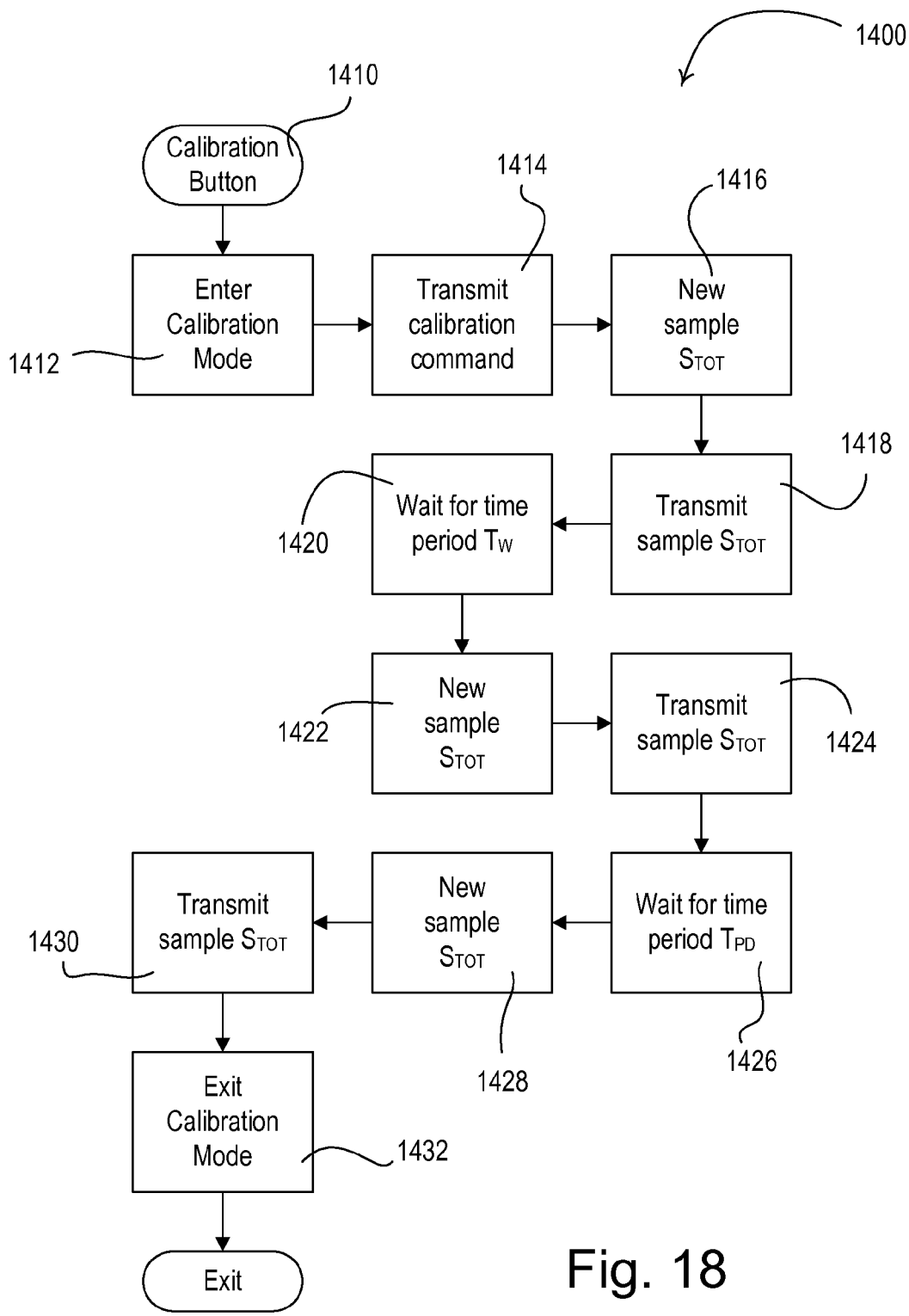
FIG. 18 a simplified flowchart of a calibration button procedure executed by the controller of the daylight sensor of FIG. 1 according to the third embodiment of the present invention.

FIG. 18 a simplified flowchart of the "single-button-press" calibration button procedure 1400 executed by the controller 230 of the daylight sensor 120 during the single-button-press daylight sensor calibration procedure 1400 in response to an actuation of the calibration button 150 or in response to an excitation of the laser pointer circuit 244 at step 1410. The controller 230 enters calibration mode at step 1412 and transmits a digital message including a calibration command to the dimmer switch 110 at step 1414. The controller 230 then collects a new total light intensity sample $S_{TOT}$ of the total light level control signal $V_{TOT}$ at step 1416 and transmits the new total light intensity sample $S_{TOT}$ to the dimmer switch 110 at step 1418. After receiving the new total light intensity sample $S_{TOT}$, the dimmer switch 110 will adjust the present intensity $L_{PRES}$ of the lighting load 104 to the maximum intensity (i.e., 100%) during the gain calibration procedure 1600 (as will be described in greater detail below with reference to FIG. 20). At step 1420, the controller 230 of the daylight sensor 120 waits for the time period $T_W$ (i.e., five minutes) to allow the lighting load 104 to warm up, after which the controller samples the total light level control signal $V_{TOT}$ at step 1422 and transmits the new total light intensity sample $S_{TOT}$ to the dimmer switch 110 at step 1424. After receiving the next total light intensity sample $S_{TOT}$, the dimmer switch 110 will immediately turn off the lighting load 104 (i.e., without using a delay or a fade rate). At step 1426, the controller 230 of the daylight sensor 120 waits the small time period $T_{PD}$ (i.e., 50 msec) for the photosensitive diode current $I_{PD}$ to become representative of the total light intensity $L_{T\text{-}SNSR}$. The controller 230 then samples the total light level control signal $V_{TOT}$ at step 1428, transmits the new total light intensity sample $S_{TOT}$ to the dimmer switch 110 at step 1430, and exits the calibration mode at step 1432, before the calibration button procedure 1400 exits.

Figure 19:
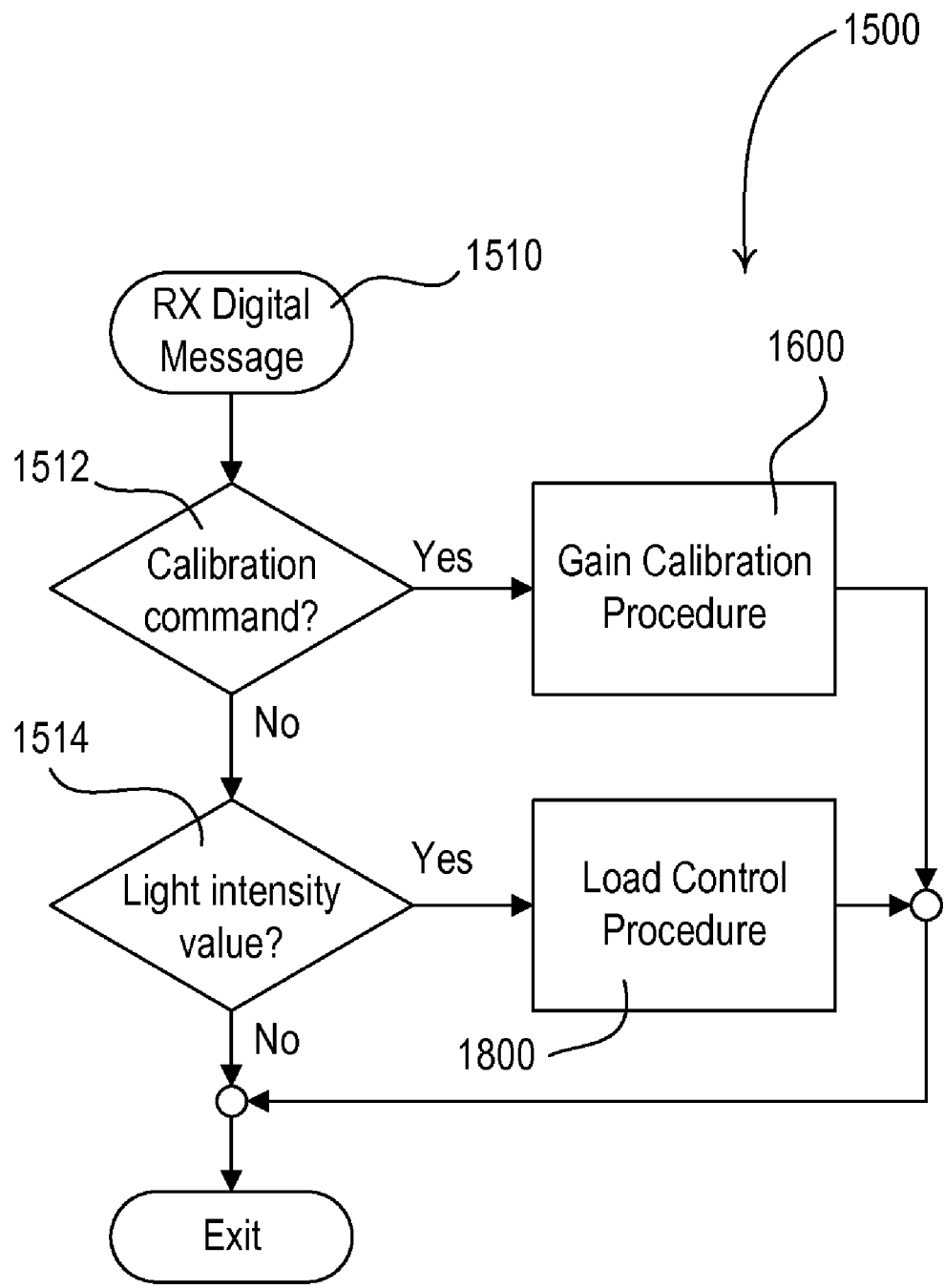
FIG. 19 is a simplified flowchart of a receive procedure executed by the controller of the dimmer switch of FIG. 1 according to the third embodiment of the present invention.

FIG. 19 is a simplified flowchart of a receive procedure 1500 executed by the controller 214 of the dimmer switch 110 when a digital message is received from the daylight sensor 120 at step 1510. If the received digital message includes a calibration command from the daylight sensor 120 at step 1512, the controller 214 of the dimmer switch 110 executes the gain calibration procedure 1600 and the receive procedure 1500 exits. If the received digital message does not include a calibration command at step 1512, but includes a light intensity value from the daylight sensor 120 at step 1514, the controller 214 executes the load control procedure 1800, before the receive procedure 1500 exits.

Figure 20:
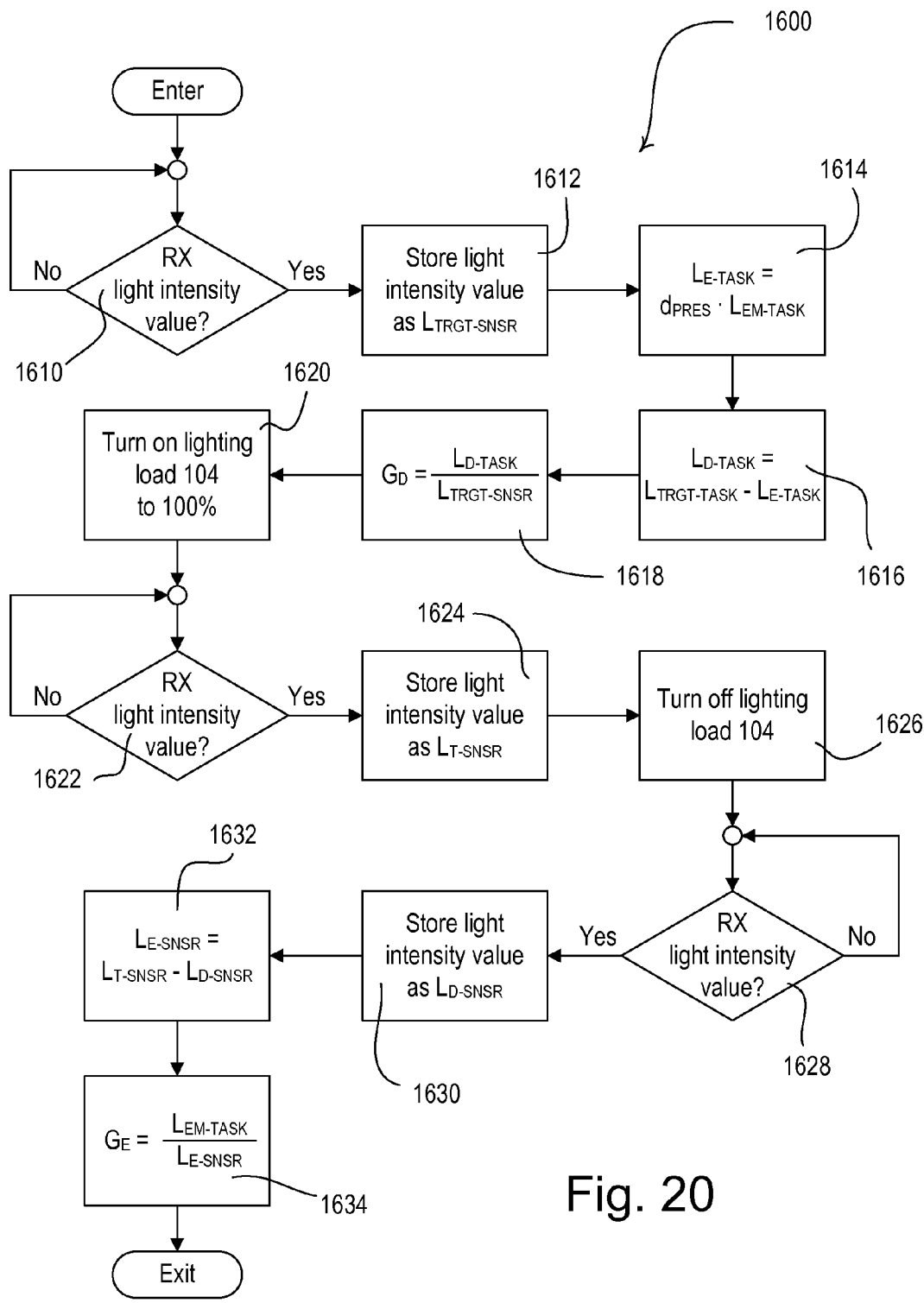
FIG. 20 is a simplified flowchart of a gain calibration procedure executed by the controller of the dimmer switch of FIG. 1 according to the third embodiment of the present invention.

FIG. 20 is a simplified flowchart of the gain calibration procedure 1600, which is executed by the controller 214 of the dimmer switch 110 in response to receiving a calibration command from the daylight sensor 120 during the receive procedure 1500. The controller 214 of the dimmer switch 110 first waits to receive a digital message including a light intensity value from the daylight sensor 120 at step 1610. When a digital message including a light intensity value is received at step 1614, the controller 214 stores the light intensity value in the memory 216 as a target light intensity $L_{TRGT\text{-}SNSR}$ as measured by the daylight sensor 120 at step 1612. The target light intensity $L_{TRGT\text{-}SNSR}$ is representative of the total light intensity measured by the daylight sensor when the present intensity $L_{PRES}$ of the lighting load 104 has been adjusted to achieve the target light intensity $L_{TRGT\text{-}TASK}$ on the task surface 136 at step 1312 of the single-button-press daylight sensor calibration procedure 1300 shown in FIG. 17.

Next, the controller 214 uses the target light intensity $L_{TRGT\text{-}SNSR}$ as measured by the daylight sensor 120 (from step 1612) to calculate the daylight gain $G_D$. At step 1614, the controller 214 calculates the light intensity $L_{E\text{-}TASK}$ on the task surface 136 from only the lighting load 104 by multiplying the present dimming percentage $d_{PRES}$ of the lighting load 104 by the maximum light intensity $L_{EM\text{-}TASK}$ on the task surface 136 from only the lighting load 104 (i.e., $L_{E\text{-}TASK}=d_{PRES}\cdot L_{EM\text{-}TASK}$). The controller 214 now calculates the light intensity $L_{D\text{-}TASK}$ on the task surface 136 from only daylight at step 1616 by subtracting the light intensity $L_{E\text{-}TASK}$ on the task surface 136 from only the lighting load 104 (as determined at step 1614) from the target total task surface light intensity $L_{TRGT\text{-}TASK}$ (i.e., $L_{D\text{-}TASK}=L_{TRGT\text{-}TASK}-L_{E\text{-}TASK}$). Finally, the controller 214 calculates the daylight gain $G_D$ at step 1618 by dividing the light intensity $L_{D\text{-}TASK}$ on the task surface 136 from only daylight (as determined at step 1616) by the target total task surface light intensity $L_{TRGT\text{-}TASK}$ as measured by the daylight sensor 120 (as determined at step 1612), i.e., $G_D=L_{D\text{-}TASK}/L_{TRGT\text{-}SNSR}$.

Next, the controller 214 determines the influence of the lighting load 104 of the light intensities measured by the daylight sensor 120 in order to calculate the electric light gain $G_E$. The controller 214 first adjusts the present intensity $L_{PRES}$ of the lighting load 104 to the maximum light intensity (i.e., 100%) at step 1620, and waits for a digital message including a new light intensity value at step 1622. When a digital message including a new light intensity value is received at step 1622, the controller 214 stores the light intensity value in the memory 216 as the total light intensity $L_{T\text{-}SNSR}$ as measured by the daylight sensor 120 at step 1624, and turns off the lighting load 104 at step 1626, and waits for a digital message including a new light intensity value at step 1628. When the controller 214 receives the next digital message including a new light intensity value at step 1628, the controller 214 stores the light intensity value as the light intensity $L_{D\text{-}SNSR}$ measured by the daylight sensor 120 from only daylight at step 1630. At step 1632, the controller 230 calculates the light intensity $L_{E\text{-}SNSR}$ measured by the daylight sensor 120 from only the lighting load 104 by subtracting the light intensity $L_{D\text{-}SNSR}$ measured by the daylight sensor from only daylight from the total light intensity $L_{T\text{-}SNSR}$ as measured by the daylight sensor (i.e., $L_{E\text{-}SNSR}=L_{T\text{-}SNSR}-L_{D\text{-}SNSR}$). Finally, the controller 214 calculates the electric light gain $G_E$ at step 1634 by dividing the maximum light intensity $L_{EM\text{-}TASK}$ on the task surface 136 from only the lighting load 104 by the light intensity $L_{E\text{-}SNSR}$ measured by the daylight sensor 120 from only the lighting load (i.e., $G_E=L_{EM\text{-}TASK}/L_{E\text{-}SNSR}$), before the gain calibration procedure 1600 exits.

Alternatively, the gain calibration procedure 1600 could exit immediately after the daylight gain $G_D$ is calibrated at step 1618, such that the electric light gain $G_E$ remains at the default electric light gain value $G_{E\text{-}DEF}$ (i.e., 256). In addition, the daylight sensor 120 could also execute a midnight calibration procedure (similar to the midnight calibration procedure 600 of the first embodiment) when the total light intensity $L_{T\text{-}SNSR}$ as measured by the daylight sensor is less than a threshold (e.g., the midnight calibration threshold intensity $S_{TH\text{-}MID}$) in order to more accurately set the value of the maximum light intensity $L_{EM\text{-}TASK}$ on the task surface 136 from only the lighting load 104. Further, the dimmer switch 110 of the fourth embodiment could also store a historical record of the total light intensity $L_{T\text{-}SNSR}$ measured by the daylight sensor 120 in the memory 246 (similar to how the daylight sensor 120 of the first embodiment store the historical record as part of the control procedure 400 (at steps 420 and 422).

According to the fourth embodiment, the daylight sensor 120 is operable to transmit digital messages to the dimmer switch 110 using a variable transmission rate $f_{TX}$ that is dependent upon the measured total light intensity $L_{T\text{-}SNSR}$, such that the daylight sensor 120 only transmits digital messages when needed. The daylight sensor 120 is operable to determine the total light intensity $L_{T\text{-}SNSR}$ from the magnitude of the total light intensity control signal $V_{TOT}$, and to only transmit the values representative of the total light intensity $L_{T\text{-}SNSR}$ to the dimmer switch 110 when the total light intensity $L_{T\text{-}SNSR}$ measured by the daylight sensor 120 has changed by at least a first predetermined percentage $\Delta S_{MAX1}$. The variable transmission rate ensures that the daylight sensor 120 only transmits the total light intensity $L_{T\text{-}SNSR}$ when needed (i.e., when the total light intensity $L_{TOT}$ is changing quickly, but not too quickly). Because the controller 230 is able to disable the photosensitive circuit 231 (by opening the switch 235 via the photosensitive circuit enable control signal $V_{PS\_ENABLE}$), the daylight sensor 120 is able to conserve battery power by not transmitting total light intensity $L_{T\text{-}SNSR}$ measured by the daylight sensor 120 to the dimmer switch 110 when the total light intensity $L_{T\text{-}SNSR}$ is relatively constant with respect to time.

Figure 21:
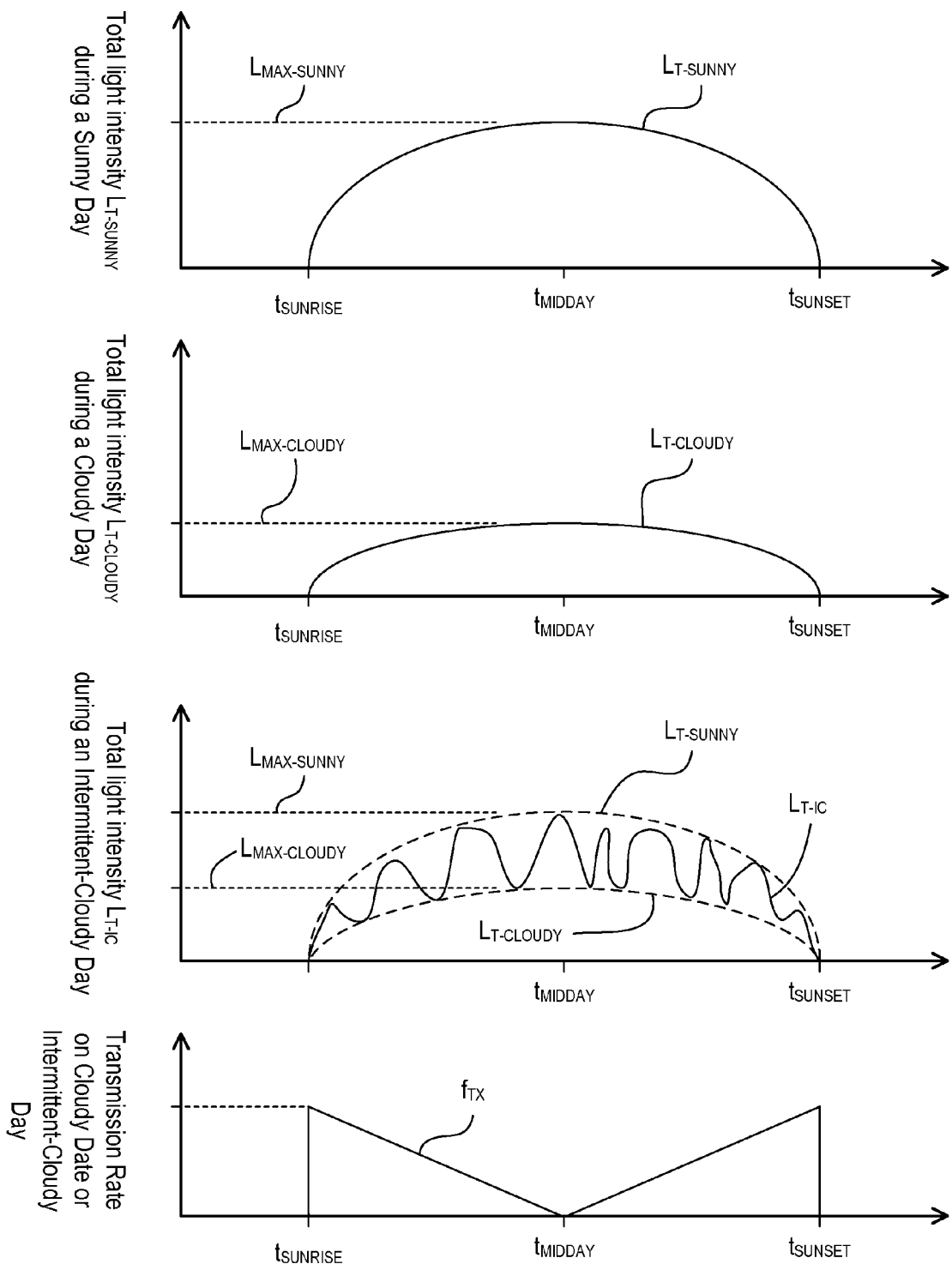
FIG. 21 shows a few example plots of total light intensities in the room of FIG. 2 with respect to time during a sunny day, a cloudy day, and an intermittent-cloudy day.

Since the total light intensity $L_{T\text{-}SNSR}$ at the daylight sensor 120 changes throughout a typical day, the variable transmission rate also changes throughout the day. FIG. 21 shows a few example plots of the total light intensity $L_{T\text{-}SNSR}$ as measured by the daylight sensor 120 with respect to time during a sunny day, a cloudy day, and an intermittent-cloudy day. The total light intensity $L_{T\text{-}SNSR}$ during a day typically takes the shape of a parabola. On a sunny day, a total sunny-day light intensity $L_{T\text{-}SUNNY}$ may increase from sunrise (at time $t_{SUNRISE}$) to a maximum sunny-day light intensity $L_{MAX\text{-}SUNNY}$ around midday (at time $t_{MIDDAY}$), and then decrease until sunset (at time $t_{SUNSET}$). On a cloudy day, a total cloudy-day light intensity $L_{T\text{-}CLOUDY}$ may increase from sunrise to a maximum cloudy-day light intensity $L_{MAX\text{-}CLOUDY}$ around midday, and then decreases until sunset. The maximum sunny-day light intensity $L_{MAX\text{-}SUNNY}$ is typically greater than the maximum cloudy-day light intensity $L_{MAX\text{-}CLOUDY}$. During days when there are intermittent clouds passing the building in which the room 130 is located, a total light intensity $L_{T\text{-}IC}$ may fluctuate between the total cloudy-day light intensity $L_{T\text{-}CLOUDY}$ and the total sunny-day light intensity $L_{T\text{-}SUNNY}$ as shown in FIG. 21.

The daylight sensor 120 of the fourth embodiment is further operable to ignore fluctuations in the measured total light intensity $L_{T\text{-}SNSR}$ that are large in magnitude and short in time duration (i.e., during intermittent-cloudy days), so as to reduce the transmission rate and further conserve battery life. Specifically, the variable transmission rate of the daylight sensor 120 is dependent upon the rate of change of the total light intensity $L_{T\text{-}SNSR}$ measured by the daylight sensor. The daylight sensor 120 does not transmit the total light intensity $L_{TOT}$ to the dimmer switch 110 if the total light intensity $L_{TOT}$ has changed by more than a second predetermined percentage $\Delta S_{MAX2}$ during a predetermined time period $T_{TX\text{-}MIN}$. Accordingly, the variable transmission rate of the daylight sensor 120 of the fourth embodiment of the present invention results in the average time between transmissions by the daylight sensor during the course of a day being greater than approximately 420 seconds.

Figure 22:
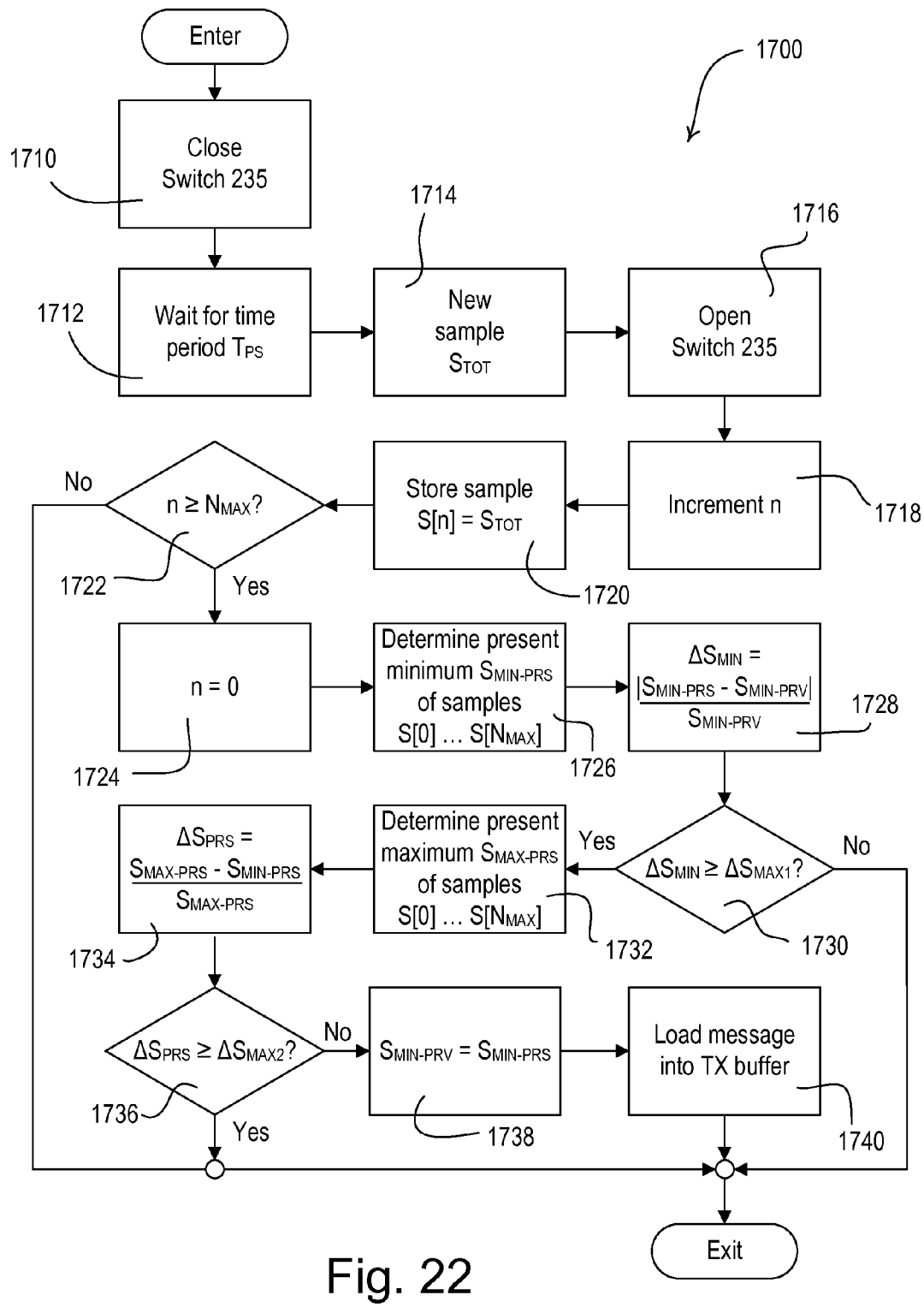
FIG. 22 is a simplified flowchart of a variable transmission control procedure executed by the controller of the daylight sensor of FIG. 1 according to the third embodiment of the present invention.

FIG. 22 is a simplified flowchart of a variable transmission control procedure 1700 executed by the controller 230 of the daylight sensor 120 according to the fourth embodiment of the present invention, such that the daylight sensor 120 transmits digital messages using the variable transmission rate. The controller 230 executes the variable transmission control procedure 400 periodically (e.g., approximately once every second) during normal operation in order to sample the total light intensity control signal $V_{TOT}$ and to collect a predetermined number $N_{SMPL}$ (e.g., ten) of measurements of the total light intensity $L_{T\text{-}SNSR}$ during consecutive non-overlapping time intervals (i.e., windows) that each have a length equal to a predetermined time period $T_{WIN}$. For example, the predetermined time period $T_{WIN}$ may be approximately ten seconds, but may alternatively range from approximately five seconds to thirty seconds. The controller 230 determines a predicted light intensity value for each time interval. At end of the present time interval, the controller 230 compares a light intensity value representative of the measured total light intensity $L_{T\text{-}SNSR}$ at the daylight sensor 120 to a predicted light intensity value for that time interval. The controller 230 determines whether a digital message including the light intensity value representative of the total light intensity $L_{T\text{-}SNSR}$ should be transmitted to the dimmer switch 110 in response to an error between the light intensity value representative of the measured total light intensity $L_{T\text{-}SNSR}$ and the predicted light intensity value.

Referring to FIG. 22, the controller 230 first enables the photosensitive circuit 231 at step 1710 by closing the controllable switch 235 using the photosensitive circuit enable control signal $V_{PS\_ENABLE}$. The controller 230 waits for the time period $T_{PD}$ (i.e., 50 msec) at step 1712 to allow the photosensitive diode current $I_{PD}$ to become representative of the total light intensity $L_{T\text{-}SNSR}$ at the daylight sensor 120. The controller 230 samples the total light intensity control signal $V_{TOT}$ to generate a new total light intensity sample $S_{TOT}$ at step 1714, and disables the photosensitive circuit 231 by opening the switch 235 using the photosensitive circuit enable control signal $V_{PS\_ENABLE}$ at step 1716. The controller 230 then increments a variable n by one at step 1718 and stores the new total light intensity sample $S_{TOT}$ as sample S[n] in the memory 246 at step 1720. If the variable n is less than the predetermined number $N_{SMPL}$ of samples at step 1722, the variable transmission control procedure 1700 simply exits without processing the samples S[n] stored in the memory 246. The controller 230 will execute the variable transmission control procedure 1700 once again to collect a new sample of the total light intensity control signal $V_{TOT}$.

If the variable n is greater than or equal to the predetermined number $N_{SMPL}$ of samples at step 1722, the controller 230 processes the samples S[n] stored in the memory 246 in order to determine if a digital message should be transmitted to the dimmer switch 110. First, the controller 230 resets the variable n to zero at step 1724. The controller 230 then determines if the total light intensity $L_{T\text{-}SNSR}$ has changed by at least the first predetermined percentage $\Delta S_{MAX1}$. Specifically, the controller 230 determines a present minimum sample $S_{MIN\text{-}PRS}$ of the samples S[n] stored in the memory 246 (i.e., samples S[0] through S[$N_{SMPL}$]) at step 1726. The controller 230 then calculates a minimum sample adjustment percentage $\Delta S_{MIN}$ that is representative of the amount of change of the total light intensity $L_{T\text{-}SNSR}$ at step 1728 using the equation:

$$\Delta S_{MIN} = \frac{|S_{MIN-PRS} - S_{MIN-PRV}|}{S_{MIN-PRV}}, \quad \text{(Equation 9)}$$

where the sample $S_{MIN\text{-}PRV}$ is the previous minimum sample determined during the previous time period $T_{WIN}$ that is stored in the memory 246. If the minimum sample adjustment percentage $\Delta S_{MIN}$ is less than the first predetermined percentage $\Delta S_{MAX1}$ at step 1730, the variable transmission control procedure 1700 exits without the controller 230 transmitting a digital message to the dimmer switch 110. In other words, the controller 230 has determined that the total light intensity $L_{T\text{-}SNSR}$ has not changed significantly enough to merit a transmission of a digital message. For example, the first predetermined percentage $\Delta S_{MAX1}$ may be approximately 15%, but may alternatively range from approximately 1% to 20%.

If the minimum sample adjustment percentage $\Delta S_{MIN}$ is greater than or equal to the first predetermined percentage $\Delta S_{MAX1}$ at step 430, the controller 230 determines if the data (i.e., the samples S[n] stored in the memory 246) is misbehaving by determining if the total light intensity $L_{T\text{-}SNSR}$ has changed by more than the second predetermined percentage $\Delta S_{MAX2}$ during the present time period $T_{WIN}$. Specifically, the controller 230 determines a present maximum sample $S_{MAX\text{-}PRS}$ of the samples S[n] stored in the memory 246 (i.e., samples S[0] through S[$N_{SMPL}$]) at step 1732. The controller 230 then calculates a present sample adjustment amount $\Delta S_{PRS}$, which is representative of the rate of change of the total light intensity $L_{T\text{-}SNSR}$, at step 1734 using the equation:

$$\Delta S_{PRS} = \frac{S_{MAX-PRS} - S_{MIN-PRS}}{S_{MAX-PRS}}. \quad \text{(Equation 10)}$$

If the present sample adjustment amount $\Delta S_{PRS}$ is greater than or equal to the second predetermined percentage $\Delta S_{MAX2}$ at step 1736, the variable transmission control procedure 1700 exits without transmitting a digital message to the dimmer switch 110. For example, the second predetermined percentage $\Delta S_{MAX2}$ may be approximately 10%, but may alternatively range from approximately 5% to 25%.

However, if the present sample adjustment amount $\Delta S_{PRS}$ is less than the second predetermined percentage $\Delta S_{MAX2}$ at step 1736, the controller 230 of the daylight sensor 120 sets the previous minimum sample $S_{MIN\text{-}PRV}$ equal to the present minimum sample $S_{MIN\text{-}PRS}$ at step 1738. The controller 230 then loads a digital message including a value representative of the total light intensity $L_{T\text{-}SNSR}$ as measured by the daylight sensor 120 (e.g., in foot-candles) in a transmit (TX) buffer at step 1740, before the variable transmission control procedure 1700 exits. For example, the controller 230 may include the minimum present minimum sample $S_{MIN\text{-}PRS}$ in the digital message loaded into the TX buffer. The controller 230 will transmit the digital message to the dimmer switch 110 via the RF signals 106 using a transmit procedure (not shown). An example of a transmit procedure is described in previously-referenced U.S. patent application Ser. No. 12/203,518. The variable transmission procedure 1700, as well as alternative embodiments of the variable transmission procedure, are described in greater detail in U.S. patent application Ser. No. 12/727,956, filed Mar. 19, 2010, entitled WIRELESS BATTERY-POWERED DAYLIGHT SENSOR, the entire disclosure of which is hereby incorporated by reference.

Figure 23:
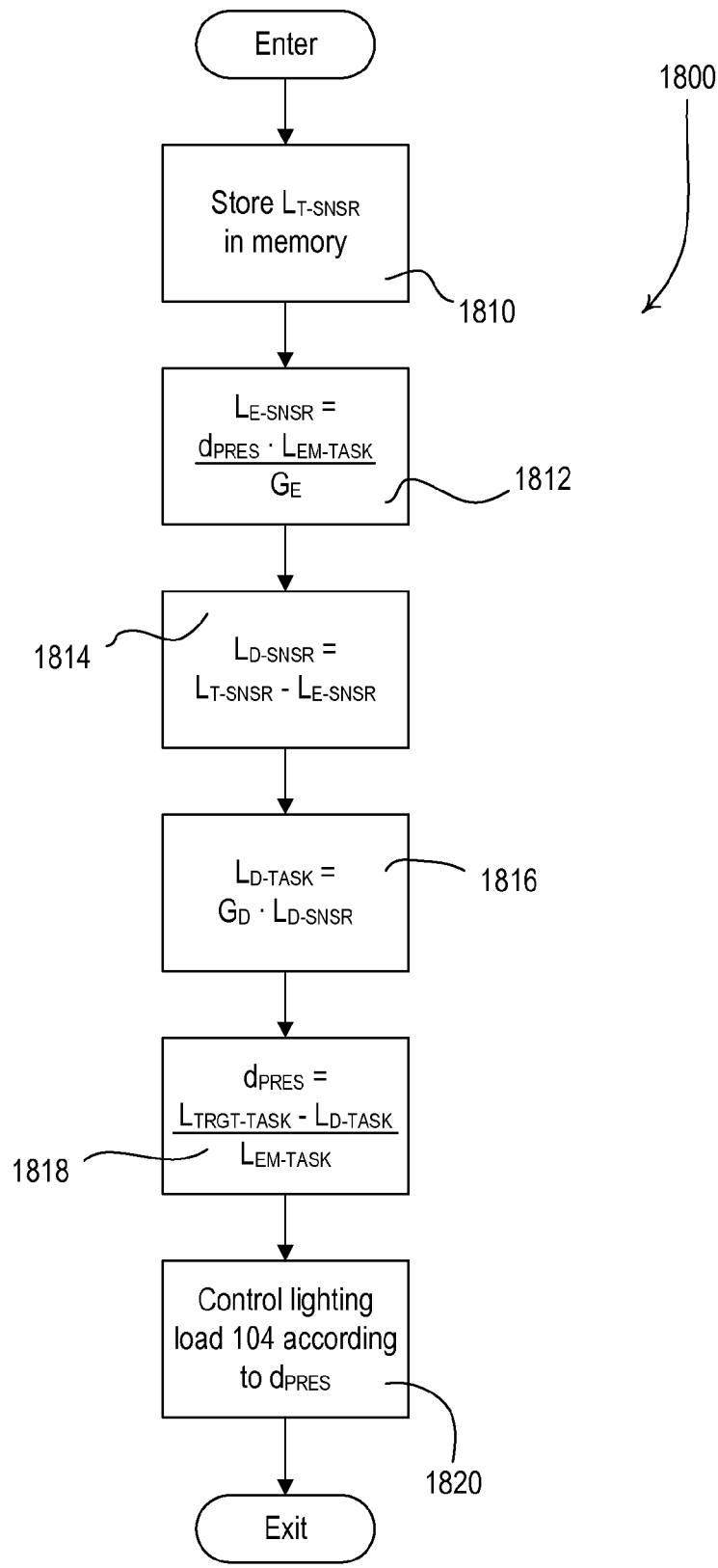
FIG. 23 is a simplified flowchart of a load control procedure executed periodically by the controller of the daylight sensor of FIG. 1 according to the third embodiment of the present invention.

FIG. 23 is a simplified flowchart of the load control procedure 1800, which is executed by the controller 214 of the dimmer switch 110 in response to receiving a light intensity value from the daylight sensor 120 during the receive procedure 1500. As previously mentioned, the dimmer switch 110 adjusts the present intensity $L_{PRES}$ of the lighting load 104 so as to control the total light intensity $L_{T-TASK}$ on the task surface towards the target total task surface light intensity $L_{TRGT-TASK}$. Specifically, the dimmer switch 110 uses a present dimming percentage $d_{PRES}$ to control the present light intensity $L_{PRES}$ of the lighting load 104. The present dimming percentage $d_{PRES}$ is calculated in response to the received digital messages and a target task surface light intensity value $L_{TRGT-TASK}$ during the load control procedure 1800. For example, the present dimming percentage $d_{PRES}$ may be a number between zero and one. The controller 214 may apply the present dimming percentage $d_{PRES}$ to different dimming curves depending upon the load type of the lighting load 104 (i.e., incandescent, fluorescent, etc.) to determine the actual new present intensity $L_{PRES}$ of the lighting load.

Referring to FIG. 23, the controller 214 first stores the light intensity value from the received digital message in the memory 216 as the total light intensity $L_{T-SNSR}$ as measured by the daylight sensor 120 at step 1810. As noted above, the value representative of the total light intensity $L_{T-SNSR}$ in the received digital message may be equal the minimum present minimum sample $S_{MIN-PRS}$ from the variable transmission control procedure 400 executed by the controller 230 of the daylight sensor 120 (i.e., $L_{T-SNSR}=S_{MIN-PRS}$). At step 1812, the controller 214 calculates the light intensity $L_{E-SNSR}$ measured by the daylight sensor 120 from only the lighting load 104 using the electric light gain $G_E$, i.e., $$L_{E-SNSR} = \frac{d_{PRES} \cdot L_{EM-TASK}}{G_E}. \quad \text{(Equation 11)}$$

At step 1814, the controller 214 calculates the light intensity $L_{D-SNSR}$ at the daylight sensor 120 from only natural light by subtracting the light intensity $L_{E-SNSR}$ at the daylight sensor from only the lighting load 104 (as calculated at step 1812) from the total light intensity $L_{T-SNSR}$ measured by the daylight sensor (as received in the digital message), i.e., $$L_{D-SNSR}=L_{T-SNSR}-L_{E-SNSR} \quad \text{(Equation 12)}$$

At step 1816, the controller 214 calculates the light intensity $L_{D-TASK}$ on the task surface from only daylight by multiplying the light intensity $L_{D-SNSR}$ at the daylight sensor 120 from only daylight by the daylight gain $G_D$, i.e., $$L_{D-TASK}=G_D \cdot L_{D-SNSR} \quad \text{(Equation 13)}$$

At step 1818, the controller 214 calculates the new present dimming percentage $d_{PRES}$ as a function of the target total task surface light intensity $L_{TRGT-TASK}$, the light intensity $L_{D-TASK}$ on the task surface from only daylight, and the maximum light intensity $L_{EM-TASK}$ on the task surface 136 from only the lighting load 104, i.e., $$d_{PRES} = \frac{L_{TRGT-TASK} - L_{D-TASK}}{L_{EM-TASK}}. \quad \text{(Equation 14)}$$

Finally, the controller 214 controls the lighting load 104 according to the new present dimming percentage $d_{PRES}$, before the load control procedure 1800 exits.

While the present invention has been described with reference to the lighting control system 100, the concepts of the present invention could also be applied to a wall-mounted load control device comprising both a photosensitive circuit and a load control circuit (e.g., a controllably conductive device).

Lighting control systems including wired daylight sensors (i.e., wired photosensors) are described in greater detail in U.S. Pat. No. 7,111,952, issued Sep. 26, 2006, entitled SYSTEM TO CONTROL DAYLIGHT AND ARTIFICIAL ILLUMINATION AND SUN GLARE IN A SPACE, and U.S. Pat. No. 7,369,060, issued May 6, 2008, entitled DISTRIBUTED INTELLIGENCE BALLAST SYSTEM AND EXTENDED LIGHTING CONTROL PROTOCOL. The entire disclosures of both patents are hereby incorporated by reference. The present application is related to U.S. Provisional Patent Application No. 61/164,098, filed Mar. 27, 2009, entitled METHOD OF CALIBRATING A DAYLIGHT SENSOR, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of calibrating a daylight sensor for measuring a light intensity in a space, the daylight sensor operating as part of a lighting control system that comprises a dimmer switch for controlling a present light intensity of a lighting load, so as to control a total light intensity on a task surface in the space, the method comprising the steps of:
   placing the daylight sensor on the task surface;
   displaying on a visual display on the daylight sensor a representation of the total light intensity measured by the daylight sensor;
   adjusting the present light intensity of the lighting load until the visual display on the daylight sensor displays a representation of the target task surface light intensity;
   actuating a button on the daylight sensor;
   measuring the total light intensity at the daylight sensor in response to the actuation of the button on the daylight sensor;
   the daylight sensor subsequently transmitting the total measured light intensity to the dimmer switch;
   the dimmer switch subsequently calculating a daylight gain in response to the total light intensity measured by the daylight sensor and the present light intensity of the lighting load; and
   the dimmer switch subsequently determining a new light intensity for the lighting load in response to the daylight gain and the total light intensity measured by the daylight sensor.

2. A method of calibrating a daylight sensor for measuring a light intensity in a space, the daylight sensor operating as part of a lighting control system that comprises a dimmer switch for controlling a present light intensity of a lighting load, so as to control a total light intensity on a task surface in the space, the method comprising the steps of:
   installing the daylight sensor on a surface;
   adjusting the present light intensity of the lighting load, such that the total light intensity on the task surface is at a target task surface light intensity;
   actuating a button on the daylight sensor;
   measuring the total light intensity at the daylight sensor in response to the actuation of the button on the daylight sensor;
   the daylight sensor subsequently transmitting the total measured light intensity to the dimmer switch;

the dimmer switch turning the lighting load on to a maximum light intensity;

subsequently measuring the light intensity at the daylight sensor to determine a total measured light intensity;

the daylight sensor subsequently transmitting the total measured light intensity to the dimmer switch;

the dimmer switch subsequently turning the lighting load off;

subsequently measuring the light intensity at the daylight sensor to determine a measured light intensity from only daylight;

the daylight sensor subsequently transmitting the measured light intensity from only daylight to the dimmer switch; and the dimmer switch calculating a daylight gain in response to the total light intensity measured by the daylight sensor and the present light intensity of the lighting load and an electric light gain in response to the total measured light intensity and the measured light intensity from only daylight.

3. The method of claim 2, comprising the step of:
the dimmer switch subsequently determining a new light intensity for the lighting load in response to the daylight gain and the total light intensity measured by the daylight sensor.

4. The method of claim 3, comprising the step of:
the dimmer switch calculating a measured light intensity from only the lighting load when the total light intensity on the task surface is at the target task surface light intensity using the present light intensity of the lighting load and a maximum light intensity possible on the task surface from only the lighting load.

5. The method of claim 4, comprising the step of:
the dimmer switch calculating a light intensity on the task surface from only daylight by subtracting the measured light intensity from only electric light from the target task surface light intensity.

6. The method of claim 5, wherein the dimmer switch calculates the daylight gain by dividing the light intensity on the task surface from only daylight by the total light intensity measured by the daylight sensor.

7. The method of claim 3, comprising the step of:
the dimmer switch loading a default value of the daylight gain when power is first applied to the dimmer switch.

8. The method of claim 7, wherein the default value of the daylight gain is approximately 1.5.

9. The method of claim 3, wherein the step of adjusting the present light intensity of the lighting load comprises actuating an intensity adjustment actuator on the dimmer switch.

10. The method of claim 3, wherein the step of adjusting the present light intensity of the lighting load comprises actuating an actuator on the daylight sensor.

11. The method of claim 2, further comprising the step of:
the dimmer switch calculating a measured light intensity from only electric light by subtracting the measured light intensity from only daylight from the total measured light intensity.

12. The method of claim 11, wherein the dimmer switch calculates the electric light gain by dividing a maximum light intensity possible on the task surface from only the lighting load by the measured light intensity from only electric light.

13. The method of claim 2, comprising the step of:
the dimmer switch loading default values of the daylight gain and the electric light gain when power is first applied to the dimmer switch.

14. The method of claim 13, wherein the default value of the daylight gain is approximately 1.5.

15. The method of claim 2, further comprising the steps:
the dimmer switch adjusting the intensity of the lighting load to a predetermined intensity when the total light intensity measured by the daylight sensor has dropped below a threshold;

the daylight sensor measuring the magnitude of the light intensity in the space when intensity of the lighting load is at the predetermined intensity to generate an electric-light-only measured light intensity value, the electric-light-only measured light intensity value being representative of the light intensity of only the lighting load;

the daylight sensor subsequently transmitting the electric-light-only measured light intensity value to the dimmer switch; and the dimmer switch storing the electric-light-only measured light intensity value in a memory.

16. The method of claim 15, comprising the step of:
the dimmer switch loading a default value of the electric-light-only measured light intensity value when power is first applied to the dimmer switch.

17. A method of calibrating a daylight sensor for measuring a light intensity in a space, the daylight sensor operating as part of a lighting control system that comprises a dimmer switch for controlling a present light intensity of a lighting load, so as to control a total light intensity on a task surface in the space, the method comprising the steps of:

installing the daylight sensor on a surface;

adjusting the present light intensity of the lighting load, such that the total light intensity on the task surface is at a target task surface light intensity;

actuating a button on the daylight sensor;

measuring the total light intensity at the daylight sensor in response to the actuation of the button on the daylight sensor;

the daylight sensor subsequently transmitting the total measured light intensity to the dimmer switch;

placing a second daylight sensor on the task surface;

measuring the total light intensity at the second daylight sensor in response to the actuation of the button on the daylight sensor;

the second daylight sensor subsequently transmitting the total measured light intensity to the dimmer switch; and the dimmer switch subsequently calculating a daylight gain in response to the total light intensities measured by both daylight sensors and the present light intensity of the lighting load.

18. A method of calibrating a daylight sensor for measuring a light intensity in a space, the daylight sensor operating as part of a lighting control system that comprises a load control device having a dimmer circuit for controlling the power delivered to a lighting load, the method comprising the steps of:

installing the daylight sensor on a surface;

the daylight sensor periodically measuring the light intensity in the space;

comparing the measured light intensity to a threshold;

the dimmer circuit adjusting the intensity of the lighting load to two predetermined intensities when the measured light intensity has dropped below the threshold;

the daylight sensor measuring the magnitude of the light intensity in the space when intensity of the lighting load is at each of the predetermined intensities to generate two electric-light-only measured light intensity values, each of the electric-light-only measured light intensity values representative of the light intensity of only the lighting load; and storing the two measured light intensities from below the threshold in a memory.

19. The method of claim 18, further comprising the steps of:
using the two electric-light-only measured light intensity values in the memory to calculate a new intensity for the lighting load; and
the dimmer circuit subsequently adjusting the intensity of the lighting load to the new intensity.

20. The method of claim 19, further comprising the step of:
using the two electric-light-only measured light intensity values in the memory to calculate a value representative of the light intensity at the daylight sensor that results from only the light emitted by the lighting load;
wherein the new intensity is a function of the difference between a present measured light intensity and the value representative of the light intensity at the daylight sensor that results from only the light emitted by the lighting load.

21. The method of claim 18, wherein the two predetermined intensities comprise 100% and 50% of a maximum intensity of the lighting load.

22. The method of claim 18, further comprising the steps of:
connecting the daylight sensor to a power source;
storing a default light intensity value in a memory, the default light intensity value in the memory representative of the light intensity of only the lighting load;
using the default light intensity value in the memory to calculate a new intensity for the lighting load after the daylight sensor has been connected to the power source and before the measured light intensity has dropped below the threshold; and
the dimmer circuit subsequently adjusting the intensity of the lighting load to the new intensity.

23. The method of claim 18, further comprising the step of:
the daylight sensor transmitting a digital message to the load control device when the measured light intensity has dropped below the threshold;
wherein the load control device adjusts the intensity of the lighting load to the predetermined intensity in response to receiving the digital message.

24. The method of claim 18, wherein the load control device comprises an electronic switch and the predetermined intensity comprises approximately 100% of the maximum intensity of the lighting load.

25. A method of calibrating a daylight sensor for measuring a light intensity in a space, the daylight sensor operating as part of a lighting control system that comprises a load control device for controlling the power delivered to a lighting load, the method comprising the steps of:
connecting the daylight sensor to a power source;
installing the daylight sensor on a surface;
the daylight sensor starting a timeout timer when the daylight sensor is connected to the power source;
the daylight sensor periodically measuring the light intensity in the space;
the daylight sensor storing each of the periodic measured light intensities and a respective time of day in a memory;
determining the time of day of a lowest one of the measured light intensities in the memory if the timeout timer expires before the measured light intensity has drops below the threshold;
comparing the measured light intensity to a threshold;
the load control device adjusting the intensity of the lighting load to a predetermined intensity when the measured light intensity has dropped below the threshold;
the daylight sensor measuring the magnitude of the light intensity in the space when intensity of the lighting load is at the predetermined intensity to generate an electric-light-only measured light intensity value, the electric-light-only measured light intensity value being representative of the light intensity of only the lighting load; and
storing the electric-light-only measured light intensity value.

26. The method of claim 25, further comprising the steps of:
the dimmer circuit adjusting the intensity of the lighting load to the predetermined intensity at the time of day of the lowest one of the measured light intensities;
the daylight sensor measuring the magnitude of the light intensity in the space at the time of day of the lowest one of the measured light intensities to generate the electric-light-only measured light intensity value; and
storing the electric-light-only measured light intensity value at the time of day of the lowest one of the measured light intensities in a memory.

27. The method of claim 25, further comprising the steps of:
the daylight sensor determining an offset time from the present time and the time of day of the lowest one of the measured light;
the daylight sensor initializing a calibration timer with the offset time;
the daylight sensor subsequently starting the calibration timer decreasing in value with respect to time;
the dimmer circuit adjusting the intensity of the lighting load to the predetermined intensity when the calibration timer expires;
the daylight sensor measuring the magnitude of the light intensity in the space after the calibration timer expires to generate the electric-light-only measured light intensity value; and
storing the electric-light-only measured light intensity value in a memory.

28. The method of claim 25, wherein the step of connecting the daylight sensor to a power source further comprises installing a battery in the daylight sensor.

29. A method of calibrating a daylight sensor for measuring a light intensity in a space, the daylight sensor operating as part of a lighting control system that comprises a load control device for controlling the power delivered to a lighting load, the method comprising the steps of:
installing the daylight sensor on a surface;
the daylight sensor periodically measuring the light intensity in the space;
comparing the measured light intensity to a threshold;
the load control device adjusting the intensity of the lighting load to a predetermined intensity when the measured light intensity has dropped below the threshold;
the daylight sensor measuring the magnitude of the light intensity in the space when intensity of the lighting load is at the predetermined intensity to generate an electric-light-only measured light intensity value, the electric-light-only measured light intensity value being representative of the light intensity of only the lighting load; and
storing the electric-light-only measured light intensity value in a memory;

the daylight sensor subsequently starting a recalibration timer;

the load control device re-adjusting the intensity of the lighting load to the predetermined intensity when the recalibration timer expires;

the daylight sensor re-measuring the magnitude of the light intensity in the space after the recalibration timer expires; and storing the re-measured light intensity in the memory.

30. The method of claim 29, further comprising the steps of:

determining an error between the previous measured light intensity from below the threshold and the re-measured light intensity from after the recalibration timer expires; and the daylight sensor re-starting the recalibration timer if the error exceeds a maximum error.

31. The method of claim 29, wherein the recalibration timer expires after approximately two days.

32. A daylight sensor for measuring a light intensity in a space, the daylight sensor adapted to operate as part of a lighting control system that comprises a dimmer circuit for controlling the amount of power delivered to a lighting load, the daylight sensor comprising:

a photosensitive circuit operable to generate a light intensity control signal in response to the light intensity in the space;

a transmitter for transmitting signals;

a controller coupled to the photosensitive circuit and the transmitter, the controller operable to transmit signals in response to the light intensity control signal, the controller further operable to periodically measure the light intensity in the space, compare the measured light intensity to a threshold, and transmit a command to adjust the intensity of the lighting load to a predetermined intensity when the measured light intensity has dropped below the threshold;

a battery for powering the photosensitive circuit, the transmitter, and the controller; and a memory coupled to the controller for storing measured light intensities;

wherein the controller measures the magnitude of the light intensity in the space when the light intensity of the lighting load is at the predetermined intensity to generate a electric-light-only measured light intensity value, and stores the electric-light-only measured light intensity value in the memory, the electric-light-only measured light intensity value being representative of the light intensity of only the lighting load, the controller starting a timeout timer when the controller becomes powered by the battery, the controller operable to store each of the periodic measured light intensities and a respective time of day in the memory, the controller further operable to determine the time of day of a lowest one of the measured light intensities in the memory if the timeout timer expires before the measured light intensity has dropped below the threshold.

33. The sensor of claim 32, wherein the controller transmits a command to adjust the light intensity of the lighting load to the predetermined intensity at the time of day of the lowest one of the measured light intensities, the controller further operable to measure the magnitude of the light intensity in the space at the time of day of the lowest measured light intensities to generate the electric-light-only measured light intensity value, and to store the electric-light-only measured light intensity value in the memory.

34. The sensor of claim 33, wherein the controller determines an offset time from the present time and the time of day of the lowest one of the measured light, initializes a calibration timer with the offset time, subsequently starts the calibration timer decreasing in value with respect to time, and transmits a command to adjust the intensity of the lighting load to the predetermined intensity when the calibration timer expires, the controller further operable to measure the magnitude of the light intensity in the space after the calibration timer expires to generate the electric-light-only measured light intensity value, and store the electric-light-only measured light intensity value in the memory.

35. The sensor of claim 32, wherein the transmitter comprises a wireless transmitter for transmitting wireless signals.

36. A daylight sensor for measuring a light intensity in a space, the daylight sensor adapted to operate as part of a lighting control system that comprises a dimmer circuit for controlling the amount of power delivered to a lighting load, the daylight sensor comprising:

a photosensitive circuit operable to generate a light intensity control signal in response to the light intensity in the space;

a transmitter for transmitting signals;

a controller coupled to the photosensitive circuit and the transmitter, the controller operable to transmit signals in response to the light intensity control signal, the controller further operable to periodically measure the light intensity in the space, compare the measured light intensity to a threshold, and transmit a command to adjust the intensity of the lighting load to a predetermined intensity when the measured light intensity has dropped below the threshold; and a memory coupled to the controller for storing measured light intensities;

wherein the controller measures the magnitude of the light intensity in the space when the light intensity of the lighting load is at the predetermined intensity to generate a electric-light-only measured light intensity value, and stores the electric-light-only measured light intensity value in the memory, the electric-light-only measured light intensity value being representative of the light intensity of only the lighting load, the controller starting a recalibration timer after the photosensitive circuit measures the magnitude of the light intensity in the space when intensity of the lighting load is at the predetermined intensity, transmits a command to adjust the intensity of the lighting load to the predetermined intensity when the recalibration timer expires, re-measures the magnitude of the light intensity in the space after the recalibration timer expires to generate a re-measured electric-light-only light intensity value, and stores the re-measured electric-light-only light intensity in the memory.

37. The sensor of claim 36, wherein the controller determines an error between the previous measured light intensity from below the threshold and the re-measured electric-light-only light intensity from after the recalibration timer expires, and re-starts the recalibration timer if the error exceeds a maximum error.

38. A method of calibrating a daylight sensor for measuring a light intensity in a space, the daylight sensor operating as part of a lighting control system that comprises a dimmer switch for controlling a present light intensity of a lighting load, so as to control a total light intensity on a task surface in the space, the method comprising the steps of:

placing the daylight sensor on the task surface;
actuating a button on the daylight sensor to adjust the present light intensity of the lighting load, such that the total light intensity on the task surface is at a target task surface light intensity;
measuring the light intensity at the daylight sensor to generate a total-at-task-surface light intensity value;
turning off the lighting load;
measuring the light intensity at the daylight sensor to generate a daylight-at-task-surface light intensity value;
installing the daylight sensor on a ceiling surface;
adjusting the present light intensity of the lighting load, such that the total light intensity on the task surface is at the target task surface light intensity;
measuring the light intensity at the daylight sensor to generate a total-at-ceiling light intensity value;
turning off the lighting load;
measuring the light intensity at the daylight sensor to generate a daylight-at-ceiling light intensity value; and
calculating one or more gains using the total-at-task-surface light intensity value, the daylight-at-task-surface light intensity value, the total-at-ceiling light intensity value, and the daylight-at-ceiling light intensity value.

39. A method of calibrating a first daylight sensor for measuring a light intensity in a space, the first daylight sensor operating as part of a lighting control system that comprises a dimmer switch for controlling a present light intensity of a lighting load, so as to control a total light intensity on a task surface in the space, the method comprising the steps of:
installing the first daylight sensor on a ceiling surface;
placing a second daylight sensor on the task surface;
measuring the light intensity at the first daylight sensor to generate a total-at-ceiling light intensity value;
adjusting the present light intensity of the lighting load, such that the total light intensity on the task surface is at a target task surface light intensity;
measuring the light intensity at the second daylight sensor to generate a total-at-task-surface light intensity value;
turning off the lighting load;
measuring the light intensity at the first daylight sensor to generate a daylight-at-ceiling light intensity value;
measuring the light intensity at the second daylight sensor to generate a daylight-at-task-surface light intensity value; and
calculating one or more gains using the total-at-task-surface light intensity value, the daylight-at-task-surface light intensity value, the total-at-ceiling light intensity value, and the daylight-at-ceiling light intensity value.

40. A method of calibrating a daylight sensor for measuring a light intensity in a space, the daylight sensor operating as part of a lighting control system that comprises a dimmer switch for controlling a present light intensity of a lighting load, so as to control a total light intensity on a task surface in the space, the method comprising the steps of:
placing the daylight sensor on the task surface;
measuring the light intensity at the daylight sensor;
displaying a representation of the total light intensity measured by the daylight sensor on a visual display of the daylight sensor;
adjusting the present light intensity of the lighting load until the visual display on the daylight sensor displays a representation of a target task surface light intensity, such that the total light intensity on the task surface is equal to the target task surface light intensity;
storing the present light intensity of the lighting load in a memory;
measuring the light intensity at the daylight sensor to generate a total-at-task-surface light intensity value;
turning off the lighting load;
measuring the light intensity at the daylight sensor to generate a daylight-at-task-surface light intensity value;
installing the daylight sensor on a ceiling surface;
adjusting the present light intensity of the lighting load to the stored light intensity in the memory;
measuring the light intensity at the daylight sensor to generate a total-at-ceiling light intensity value;
turning off the lighting load;
measuring the light intensity at the daylight sensor to generate a daylight-at-ceiling light intensity value; and
calculating one or more gains using the total-at-task-surface light intensity value, the daylight-at-task-surface light intensity value, the total-at-ceiling light intensity value, and the daylight-at-ceiling light intensity value.

41. A method of calibrating a daylight sensor for measuring a light intensity in a space, the daylight sensor operating as part of a lighting control system that comprises a dimmer switch for controlling a present light intensity of a lighting load, so as to control a total light intensity on a task surface in the space, the method comprising the steps of:
actuating a button on the daylight sensor until a visual display of the daylight sensor displays a representation of a target task surface light intensity;
automatically adjusting the present light intensity of the lighting load, such that the total light intensity on the task surface is equal to the target task surface light intensity;
placing the daylight sensor on the task surface;
measuring the light intensity at the daylight sensor to generate a total-at-task-surface light intensity value;
turning off the lighting load;
measuring the light intensity at the daylight sensor to generate a daylight-at-task-surface light intensity value;
installing the daylight sensor on a ceiling surface;
adjusting the present light intensity of the lighting load, such that the total light intensity on the task surface is at the target task surface light intensity;
measuring the light intensity at the daylight sensor to generate a total-at-ceiling light intensity value;
turning off the lighting load;
measuring the light intensity at the daylight sensor to generate a daylight-at-ceiling light intensity value; and
calculating one or more gains using the total-at-task-surface light intensity value, the daylight-at-task-surface light intensity value, the total-at-ceiling light intensity value, and the daylight-at-ceiling light intensity value.

* * * * *